(12) United States Patent
Huang et al.

(10) Patent No.: US 12,530,864 B2
(45) Date of Patent: Jan. 20, 2026

(54) CONTENT PROCESSING METHOD AND APPARATUS, COMPUTER DEVICE, AND STORAGE MEDIUM

(71) Applicant: Tencent Technology (Shenzhen) Company Limited, Guangdong (CN)

(72) Inventors: Jianhui Huang, Shenzhen (CN); Longjun Liang, Shenzhen (CN); Haibo Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 432 days.

(21) Appl. No.: 17/710,147

(22) Filed: Mar. 31, 2022

(65) Prior Publication Data

US 2022/0222920 A1 Jul. 14, 2022

Related U.S. Application Data

(63) Continuation of application No. PCT/CN2021/086180, filed on Apr. 9, 2021.

(30) Foreign Application Priority Data

May 7, 2020 (CN) .......................... 202010377381.0

(51) Int. Cl.
*G06V 10/40* (2022.01)
*G06V 10/75* (2022.01)

(52) U.S. Cl.
CPC .............. *G06V 10/76* (2022.01); *G06V 10/40* (2022.01)

(58) Field of Classification Search
CPC ........ G06V 10/76; G06V 10/40; G06V 30/41; G06V 10/82; G06F 16/9535; G06F 18/253; G06F 40/30
See application file for complete search history.

(56) References Cited

U.S. PATENT DOCUMENTS

2016/0188734 A1 6/2016 Morley et al.
2019/0050487 A1* 2/2019 Wang ................. G06Q 30/0201
(Continued)

FOREIGN PATENT DOCUMENTS

CN 109388721 A 2/2019
CN 109862432 A 6/2019
(Continued)

OTHER PUBLICATIONS

Second Office Action for corresponding Chinese application No. 202010377381.0 dated Aug. 21, 2023, 7p, in Chinese language.
(Continued)

*Primary Examiner* — Jennifer Mehmood
*Assistant Examiner* — Dustin Bilodeau
(74) *Attorney, Agent, or Firm* — Crowell & Moring LLP

(57) ABSTRACT

A content processing method is disclosed, including: obtaining a description text of to-be-processed content and an image included in the to-be-processed content; performing feature extraction on the description text based on text semantics to obtain a text eigenvector; performing feature extraction on the image based on image semantics to obtain an image eigenvector; combining the text eigenvector with the image eigenvector to obtain an image-text multi-modal vector; and generating an estimated click-through rate of the to-be-processed content according to the image-text multi-modal vector.

16 Claims, 14 Drawing Sheets

(56) References Cited

U.S. PATENT DOCUMENTS

| | | | | |
|---|---|---|---|---|
| 2019/0095529 | A1* | 3/2019 | Son | G06V 20/46 |
| 2020/0294222 | A1* | 9/2020 | Wen | G06T 7/11 |
| 2020/0334468 | A1* | 10/2020 | Agarwal | G06V 20/47 |
| 2021/0142069 | A1* | 5/2021 | Chen | G06N 3/048 |
| 2023/0139663 | A1* | 5/2023 | Liu | G06V 30/19173 |
| | | | | 382/229 |

FOREIGN PATENT DOCUMENTS

| | | | | |
|---|---|---|---|---|
| CN | 110263256 A | | 9/2019 | |
| CN | 110795657 A | | 2/2020 | |
| CN | 110991464 A | | 4/2020 | |
| CN | 111581510 A | | 8/2020 | |
| CN | 111598638 A | * | 8/2020 | G06Q 30/0201 |
| WO | WO 2021/223567 A1 | | 11/2021 | |

OTHER PUBLICATIONS

Concise Explanation of Relevancy for C1.
First Office Action for corresponding Chinese applicaiton No. 202010377381.0 dated Apr. 4, 2023, 10p, in Chinese language.
Concise Explanation of Relevance for B1.
International Search Report for priority application No. PCT/CN2021/086180 dated Jun. 23, 2021, 6p, in Chinese language.
Written Opinion for priority application No. PCT/CN2021/086180 dated Jun. 11, 2021, 7p, in Chinese language.
English language translation of the International Search Report for priority application No. PCT/CN2021/086180 dated Jun. 23, 2021, 3p.
Concise Explanation of Relevance for A10.

* cited by examiner (a)

(b)

(c)

(d)

CONTENT PROCESSING METHOD AND APPARATUS, COMPUTER DEVICE, AND STORAGE MEDIUM

RELATED APPLICATION

This application is a continuation application of International Application No. PCT/CN2021/086180, filed Apr. 9, 2021, which claims priority to Chinese Patent Application No. 202010377381.0, filed with the China National Intellectual Property Administration on May 7, 2020, and entitled "SHARED CONTENT PROCESSING METHOD AND APPARATUS, COMPUTER DEVICE, AND STORAGE MEDIUM." The applications above are incorporated herein by reference in their entireties.

TECHNICAL FIELD

This disclosure relates to the field of computer technologies, and specifically to a content processing method and apparatus, a computer device, and a storage medium.

BACKGROUND

With the rapid development of Internet technologies, various Internet platforms provide more information resources for users, for example, various shared content such as video content, image-text information, and content generated by users. A user may obtain content from various platforms such as social networks, video sharing networks, community forums, and blogs. With the rapid development of artificial intelligence (AI) technologies, various shared content may be intelligently recommended to users based on technologies such as cloud computing, distributed storage, and big data processing.

Currently, the related technology pushes content to corresponding users based on content popularity or score information. In this manner, generally, content that recently has been exposed and clicked for multiple times is more likely to be preferentially exposed again in pushing sorting. However, some quality content that has no impression or a low impression rate in a cold start stage lacks impression opportunities, resulting in low pushing quality and efficiency of quality content.

SUMMARY

A content processing method is provided. The method includes:
  obtaining a description text and an image of a to-be-processed content;
  performing feature extraction on the description text based on text semantics to obtain a text eigenvector;
  performing feature extraction on the image based on image semantics to obtain an image eigenvector;
  combining the text eigenvector with the image eigenvector to obtain an image-text multi-modal vector; and
  generating an estimated click-through rate of the to-be-processed content according to the image-text multi-modal vector.

A content processing apparatus is provided. The apparatus includes:
  a data obtaining module, configured to obtain a description text of to-be-processed content and an image included in the to-be-processed content;
  a text feature extraction module, configured to perform feature extraction on the description text based on text semantics to obtain a text eigenvector;
  an image feature extraction module, configured to perform feature extraction on the image based on image semantics to obtain an image eigenvector;
  a feature combination module, configured to combine the text eigenvector with the image eigenvector to obtain an image-text multi-modal vector; and
  a click-through rate estimation module, configured to estimate a click-through rate of the to-be-processed content according to the image-text multi-modal vector.

A computer device, comprising a processor and a memory, the memory storing computer-readable instructions, the processor being configured to execute the computer-readable instructions to cause the computer device to perform steps, comprising:
  obtaining a description text and an image of a to-be-processed content;
  performing feature extraction on the description text based on text semantics to obtain a text eigenvector;
  performing feature extraction on the image based on image semantics to obtain an image eigenvector;
  combining the text eigenvector with the image eigenvector to obtain an image-text multi-modal vector; and
  generating an estimated click-through rate of the to-be-processed content according to the image-text multi-modal vector.

A non-transitory computer-readable storage medium, storing computer-readable instructions, the computer-readable instructions being executed by one or more processors to cause a computer device to performed steps, comprising:
  obtaining a description text and an image of a to-be-processed content;
  performing feature extraction on the description text based on text semantics to obtain a text eigenvector;
  performing feature extraction on the image based on image semantics to obtain an image eigenvector;
  combining the text eigenvector with the image eigenvector to obtain an image-text multi-modal vector; and
  generating an estimated click-through rate of the to-be-processed content according to the image-text multi-modal vector.

A computer program product or a computer program is provided. The computer program product or the computer program includes computer instructions, and the computer instructions are stored in a computer-readable storage medium. A processor of a computer device reads the computer instructions from the computer-readable storage medium, and when executing the computer instructions, the processor performs the following steps:
  obtaining a description text of to-be-processed content and an image included in the to-be-processed content;
  performing feature extraction on the description text based on text semantics to obtain a text eigenvector;
  performing feature extraction on the image based on image semantics to obtain an image eigenvector;
  combining the text eigenvector with the image eigenvector to obtain an image-text multi-modal vector; and
  generating an estimated click-through rate of the to-be-processed content according to the image-text multi-modal vector.

Details of one or more embodiments of this disclosure are provided in the accompanying drawings and descriptions below. Other features, objectives, and advantages of this disclosure become apparent from the specification, the accompanying drawings, and the claims.

BRIEF DESCRIPTION OF THE DRAWINGS

To describe the technical solutions in embodiments of this disclosure more clearly, the following briefly describes the accompanying drawings required for describing the embodiments. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

To make objectives, technical solutions, and advantages of this disclosure clearer and more comprehensible, this disclosure is further described in detail with reference to the accompanying drawings and embodiments. It is to be understood that the specific embodiments described herein are only used for explaining this disclosure, and are not used for limiting this disclosure.

Solutions provided in the embodiments of this disclosure relate to technologies such as artificial intelligence, machine learning (ML), computer vision (CV), and image processing. AI is a theory, technology, and application system that uses a digital computer or a machine controlled by the digital computer to simulate, extend, and expand human intelligence, perceive an environment, acquire knowledge, and use knowledge to obtain an optimal result, so that the machines have the functions of perception, reasoning, and decision-making. Machine Learning is a multi-field interdiscipline, and relates to a plurality of disciplines such as the probability theory, statistics, the approximation theory, convex analysis, and the algorithm complexity theory. The machine learning studies how a computer simulates or implements a human learning behavior to obtain new knowledge or skills, and reorganize an existing knowledge structure, so as to keep improving its performance. In computer vision and image processing technologies, a computer device replaces human eyes to perform machine vision such as identify, track, and measure a target and further perform graphics processing, and attempts to establish an artificial intelligence system that may obtain information from an image or multi-dimensional data. A description text and an image in to-be-processed content are processed based on machine learning and the image processing technology. Therefore, a click-through rate of content can be effectively estimated, and content can be intelligently recommended according to an estimation result of the click-through rate.

A content processing method provided in this disclosure is applicable to a computer device. The computer device may be a terminal or a server. It may be understood that, the content processing method provided in this disclosure may be applicable to a terminal, or may be applicable to a server, or may be applicable to a system including a terminal and a server, and is implemented through interaction between a terminal and a server.

Figure 1:
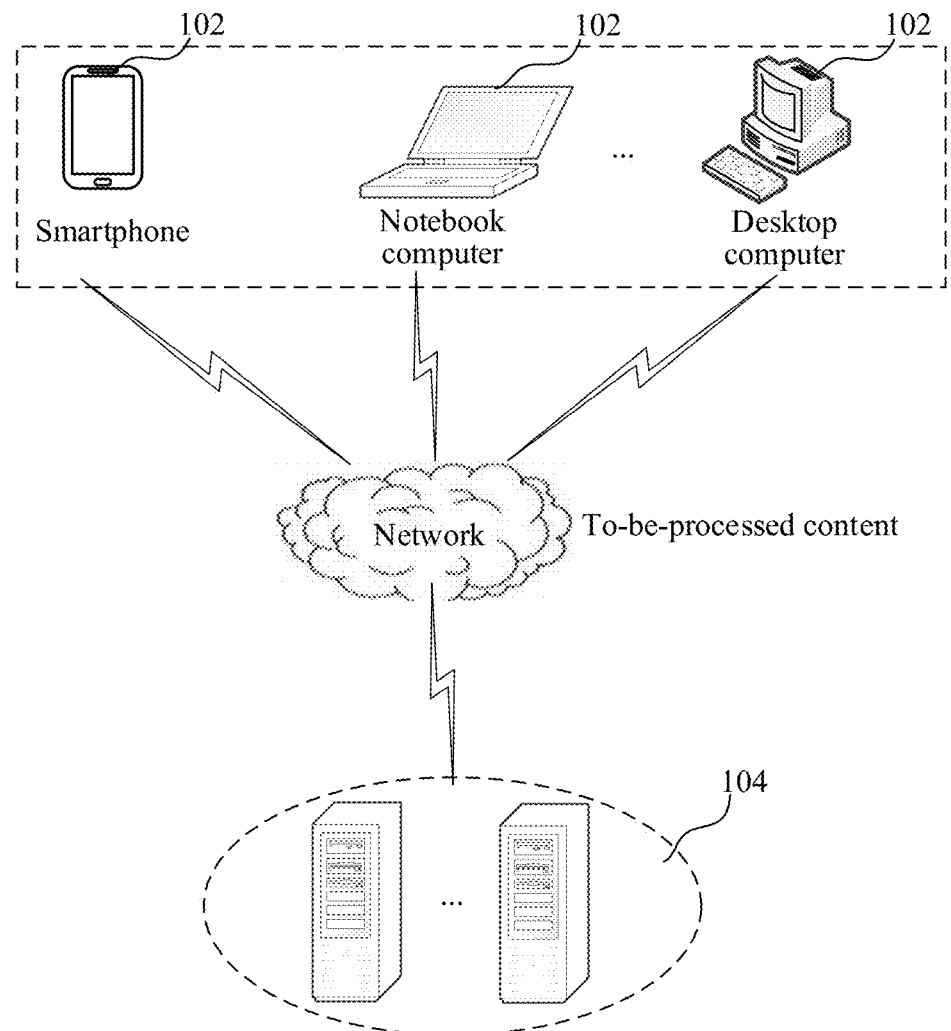
FIG. 1 is a diagram of an application environment of a content processing method according to an embodiment of this disclosure.

In an embodiment, the computer device may be a server. The content processing method provided in this disclosure is applicable to a diagram of an application environment shown in FIG. 1. The application environment includes a system of a terminal and a server, and is implemented through interaction between a terminal and a server. The terminal 102 communicates with a server 104 by using a network. The terminal 102 may be a smartphone, a tablet computer, a notebook computer, a desktop computer, a smart speaker, a smart watch, or the like, but is not limited thereto. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Specifically, a user may post various content through the terminal 102, and the server 104 obtains and stores the content posted by the terminal 102. The server 104 further obtains a description text of to-be-processed content and an image included in the to-be-processed content, and performs feature extraction on the description text based on text semantics to obtain a text eigenvector corresponding to the description text. The server 104 performs feature extraction on the image based on image semantics to obtain an image eigenvector corresponding to the image. Features of the text eigenvector and the image eigenvector are combined to obtain an image-text multi-modal vector that includes the text semantics and the image semantics. Then, the server 104 estimates the click-through rate of the to-be-processed content according to the obtained image-text multi-modal vector.

Figure 2:
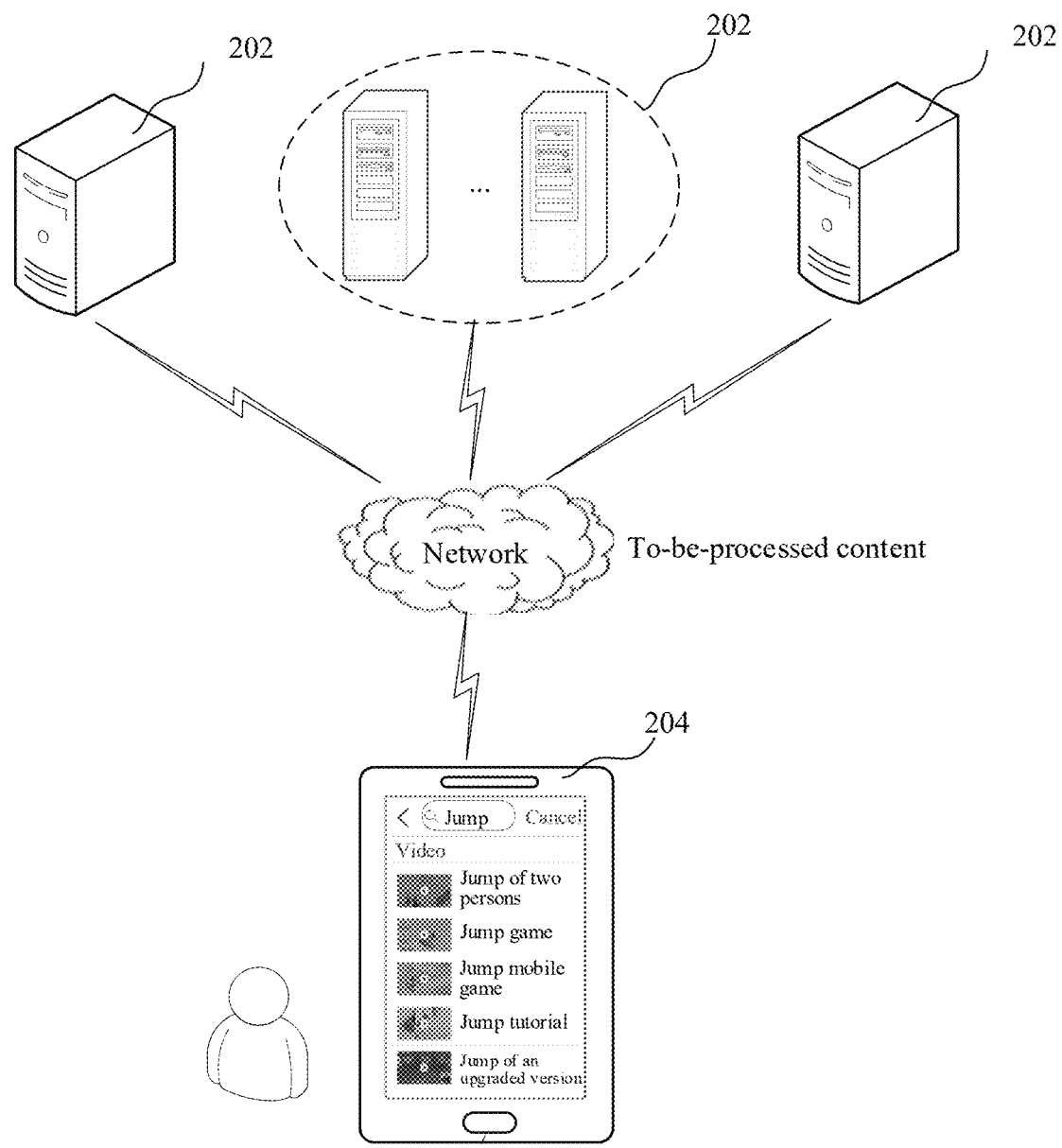
FIG. 2 is a diagram of an application environment of a content processing method according to another embodiment of this disclosure.

In another embodiment, the computer device may be a terminal. The content processing method provided in this disclosure is applicable to a diagram of an application environment shown in FIG. 2. The application environment includes a system of a terminal and a server, and is implemented through interaction between a terminal and a server. A server 202 communicates with a terminal 204 through a network. The server 202 may include servers corresponding to various content types. The server 202 includes a large amount of to-be-processed content, for example, may include content uploaded by users and content crawled from various content websites. A user may obtain the to-be-processed content from the server 202 through the corresponding terminal 204. Specifically, the terminal 204 may obtain matched to-be-processed content from the server 202 according to an inputted search keyword. The terminal 204 further obtains a description text of to-be-processed content and an image included in the to-be-processed content, and performs feature extraction on the description text based on text semantics to obtain a text eigenvector corresponding to the description text. The terminal 204 performs feature extraction on the image based on image semantics to obtain an image eigenvector corresponding to the image. Features of the text eigenvector and the image eigenvector are combined to obtain an image-text multi-modal vector that includes the text semantics and the image semantics. Then, the terminal 204 estimates a click-through rate of the to-be-processed content according to the obtained image-text multi-modal vector to obtain a corresponding estimated click-through rate. Then, the terminal 204 may further sort to-be-processed content according to an estimated click-through rate of each to-be-processed content, and display the sorted content in a display area of the terminal 204.

Figure 3:
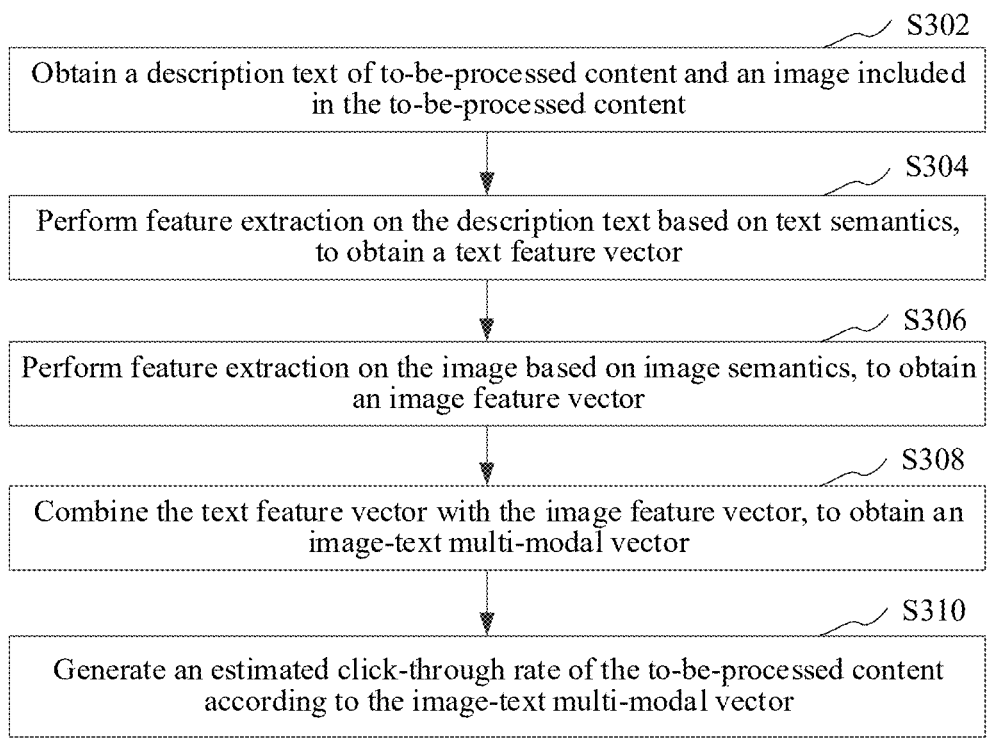
FIG. 3 is a schematic flowchart of a content processing method according to an embodiment of this disclosure.

As shown in FIG. 3, an embodiment provides a content processing method. For example, the method is applied to a computer device. The computer device specifically may be a terminal or a server. In this embodiment, the method includes the following steps:

S302: Obtain a description text of to-be-processed content and an image included in the to-be-processed content.

Sharing may represent a common network function in various Internet clients or browsers. A user may post or obtain various information content such as articles, images, videos, or web pages through various Internet platforms. The information content may be posted or shared through various platforms and channels such as social networks, video sharing networks, community forums, and blogs to share with another user.

The to-be-processed content may include, but is not limited to, an article, an image, a video, or a web page, and specifically may include various forms of information content such as user generated content (UGC), advertisements, web pages, and shared content. The UGC is user generated content, that is, content created by a user and displayed or provided to another user through an Internet platform. For example, a social network, a video sharing network, a community forum, and a blog are all main application forms of UGC. The shared content may be content for dissemination or sharing.

The description text is to describe a feature of the content, for example, title information topic information, and text content of the to-be-processed content, in the form of text. The image included in the to-be-processed content is an image in the to-be-processed content, for example, may be an image included in the to-be-processed content, or may be a local image in the to-be-processed content. For example, when the to-be-processed content is video content, the image included in the to-be-processed content may be a frame image of shared video content.

For example, after obtaining the to-be-processed content, the computer device obtains the description text of the to-be-processed content and the image included in the to-be-processed content. The to-be-processed content obtained by the computer may be content posted by a user, may be shared content to be pushed, or may be to-be-recommended content corresponding to a search keyword. This is not limited herein.

For example, the computer device may directly obtain the title information or accompanying text information of the to-be-processed content to obtain the description text of the to-be-processed content. The computer device may directly obtain the image included in the to-be-processed content. For example, if the to-be-processed content is video content or content in another dynamic form, the computer may further obtain a cover image of the video content, or obtain a key frame image from the video content as an image included in the video content.

In an embodiment, when the to-be-processed content is the video content, the description text is the text content included in the video content, and the image is the image extracted from the video content.

The video content is content including a video, and the video includes a series of consecutive images. For example, the video content may include a video self-defined by a user or an advertisement video. A key frame is a frame of a key action in a movement or a change of a character or an object, and a key frame image in the video content is a frame image that may reflect a representative characteristic of the video content. In an embodiment, the image of the video content may be a preset cover image of the video content. In another embodiment, the image of the video content may also be a key frame image extracted from the video content.

The video content usually includes title information and video content. During processing of content in the form of video, the description text is a title of the video content, and the image is a key frame image of the video content. Generally, the title and the key frame image of the video content may reflect content meaning represented by the video content.

In an embodiment, the image is a key frame image extracted from the video content, the key frame image is obtained through an image extraction step, and the image extraction step includes: extracting at least two video key frames from the video content; determining relevance between each of the at least two video key frames and the description text; and determining a key frame image in the at least two video key frames according to the relevance.

After obtaining the video content, the computer device obtains the key frame image of the video content by extracting a key frame from the video content. Specifically, the video content includes at least two video segments. The computer device extracts at least two video key frames from the video content, and specifically may extract a corresponding video key frame from each video segment. The computer device further determines the relevance between each of the at least two video key frames and the description text, and then determines the key frame image from the at least two video key frames according to the relevance. In this way, the key frame image can be effectively extracted from the video content. For example, a key frame image may be specifically extracted from a video segment based on a frame averaging algorithm, a moving objective detection algorithm, or the like. The most representative image can be effectively obtained from the video content by extracting the key frame image from the video content.

S304: Perform feature extraction on the description text based on text semantics to obtain a text eigenvector.

Semantics may represent concepts and meanings represented by an object in a display world corresponding to data and a relationship between these meanings, and is interpretation and logical representation of data in a particular field. The text semantics is meaning and logical representation corresponding to the description text.

An eigenvector is a professional term in mathematics, that is, an eigenvector of linear transform is a non-degenerate vector. A direction of the eigenvector does not change in the transform, and a scaling ratio of the vector in the transform is an eigenvalue of the vector. A linear transform usually may be completely described by an eigenvalue and an eigenvector, and an eigenvector set with the same eigenvalue is referred to as an eigenspace. The text eigenvector is an eigenvector representation that is based on text semantics and that is obtained through linear transform and feature extraction of the description text.

After obtaining the description text of the to-be-processed content, the computer device performs feature extraction on the description text based on text semantics to obtain the text eigenvector corresponding to the description text. The computer device may perform feature extraction on the description text based on a preset algorithm, a pre-trained algorithm model, or the like, and specifically based on a trained language model with a natural language processing (NLP) capability, for example, a bidirectional encoder representations from transformers model (BERT model), a convolutional latent semantics model (CLSM model), a long short-term memory model (LSTM model), or a word to vector model (Word2Vec model, that is, a model used to produce a word vector).

Text semantics included in the description text can be effectively extracted by performing feature extraction on the description text, and the to-be-processed content can be further analyzed based on the text semantics.

S306: Perform feature extraction on the image based on image semantics to obtain an image eigenvector.

The image semantics is divided into a visual layer, an object layer, and a conceptual layer. The visual layer is the commonly understood bottom layer, that is, color, texture, shape, and the like. These features may be referred to as bottom-layer feature semantics. The object layer is an intermediate layer, usually includes an attribute feature and the like, and is a state of an object in a moment. The conceptual layer is a higher layer and is something expressed by the image and closest to human understanding. For example, an image includes sand, blue sky, sea water, and the like. Generally, the visual layer is distinction between pieces, the object layer is sand, blue sky, and sea water, and the conceptual layer is the beach and may represent the category of the image, that is, semantics represented by the entire image.

The image feature is used to describe the property of the scenery corresponding to an image area, and includes a color feature, a texture feature, a shape feature, and a space relation feature. These features may be combined to represent a semantics category of the image. The image semantics in this embodiment is an image feature that represents a semantics category of the image. The image eigenvector is an eigenvector representation corresponding to the image semantics.

After obtaining the image included in the to-be-processed content, the computer device performs feature extraction on the image based on image semantics to obtain an image eigenvector corresponding to the image. Specifically, the computer device may perform feature extraction on the image through a trained image semantics extraction model, for example, an image semantics extraction model such as a residual network (ResNet), a convolutional neural network (CNN), or a deep neural network model (DNN). The image semantics extraction model may also be a combination of various neural network models.

The image semantics included in the image can be effectively extracted by performing feature extraction on the image included in the to-be-processed content, and then the to-be-processed content can be analyzed based on the image semantics.

S308: Combine the text eigenvector with the image eigenvector to obtain an image-text multi-modal vector.

Each information source or form may be a modality, for example, each of a text, an image, a speech, and the like corresponds to a modality. The multi-modal vector may indicate a feature representation obtained through learning by eliminating redundancy between multiple modalities based on complementarity between the modalities. That is, information in multiple modalities is mapped to a unified multi-modal vector space.

Feature combination is to generate a new feature in a particular manner based on different extracted features to obtain a more effective feature. The image-text multi-modal vector may be a joint representation of the text eigenvector and the image eigenvector.

After obtaining the text eigenvector corresponding to the description text and the image eigenvector corresponding to the image respectively, the computer device further performs feature combination on the text eigenvector and the image eigenvector to obtain the image-text multi-modal vector of the to-be-processed content.

Specifically, the computer device may combine the text eigenvector with the image eigenvector through vector connection, dot product, a machine learning model, or the like to obtain the image-text multi-modal vector. After obtaining the text eigenvector and the image eigenvector of the to-be-processed content respectively, the computer device performs feature combination on the text eigenvector and the image eigenvector. In this way, the text semantics and the image semantics of the to-be-processed content can be effectively extracted, so that the image-text multi-modal vector can be obtained precisely and effectively.

S310: Generate an estimated click-through rate of the to-be-processed content according to the image-text multi-modal vector.

A click-through rate (CTR) is a click-through rate of network information (for example, image information, video information, or advertisement information) in Internet, that is, a ratio of an actual number of clicks of information content to a number of display times (that is, a number of impressions). The click-through rate usually may reflect the quality effect of the to-be-processed content, and may be used as an indicator for measuring the quality effect of the to-be-processed content. Advertising content is used as an example, and the CTR is an important indicator for measuring the effect of Internet advertising.

Estimation of a click-through rate is estimation of a click status of the to-be-processed content to determine a probability that the to-be-processed content is clicked by users. In an embodiment, the to-be-processed content may be recommended based on an estimated click-through rate obtained through click-through rate estimation.

After combining the extracted text eigenvector with the extracted image eigenvector to obtain the image-text multi-modal vector, the computer device estimates a click-through rate of the to-be-processed content according to the image-text multi-modal vector. Specifically, the computer device may estimate the click-through rate of the to-be-processed content through regression estimation according to the image-text multi-modal vector. In another embodiment, the computer device may further estimate the click-through rate of the to-be-processed content based on a pre-trained click-through rate estimation model according to the image-text multi-modal vector. Therefore, the click-through rate of the to-be-processed content can be accurately and effectively estimated according to the multi-modal vector of the to-be-processed content.

In the foregoing content processing method, after obtaining the description text and the image included in the to-be-processed content, the computer device performs feature extraction on the description text based on the text semantics to effectively obtain the text eigenvector corresponding to the description text. The computer device performs feature extraction on the image based on the image semantics to effectively obtain the image eigenvector corresponding to the image. The computer device performs feature combination on the text eigenvector and the image eigenvector to effectively obtain the image-text multi-modal vector including the text semantics and the image semantics. The computer device further estimates the click-through rate of the to-be-processed content according to the obtained image-text multi-modal vector. Because the image-text multi-modal vector includes the text semantics and the image semantics of the content, the image-text multi-modal vector can accurately reflect the association between the image and the text of the content, and content whose image and text do not correspond to each other can be effectively identified. Because the click-through rate of the content is estimated under the dual guidance of the text semantics and the image semantics included in the image-text multi-modal vector, the click-through rate corresponding to the to-be-processed content can be precisely estimated to obtain a more accurate and appropriate estimated click-through rate. This effectively improves the estimation precision of the click-through rate of the content.

In an embodiment, the text eigenvector is extracted through a text semantics extraction network included in the click-through rate estimation model. The image eigenvector is extracted through an image semantics extraction network included in the click-through rate estimation model.

The click-through rate estimation model is a trained model with a click-through rate estimation capability, and specifically may be a neural network model based on machine learning. The click-through rate estimation model includes the text semantics extraction network and the image semantics extraction network. The text semantics extraction network may be a network structure based on a text semantics model, for example, may be a metamodel in the text semantics model, that is, a part of network structure included in the text semantics model and configured to extract the text eigenvector. The metamodel describes an element, a relationship between elements, and a representation in the model, and the model includes the metamodel. A neural network model is used as an example, and a metamodel may be considered as a part of neural network structure of the model and is configured to extract a specific feature representation.

Similarly, the image semantics extraction network may be a network structure based on an image semantics model, for example, may be a metamodel in the image semantics model, that is, a part of network structure included in the image semantics model and configured to extract the image eigenvector.

The text semantics extraction network included in the click-through rate estimation model is configured to extract the text eigenvector of the description text, and the image semantics extraction network included in the click-through rate estimation model is configured to extract the image eigenvector. The text eigenvector and the image eigenvector of the to-be-processed content are extracted respectively through channels corresponding to the text semantics extraction network and the image semantics extraction network in the click-through rate estimation model. This can precisely and effectively extract multi-modal features of the to-be-processed content respectively to effectively obtain a vector representation corresponding to the text semantics and the image semantics of the to-be-processed content.

In an embodiment, the performing feature extraction on the description text based on text semantics to obtain a text eigenvector includes: extracting the text semantics feature from the description text through the text semantics extraction network; and encoding based on the text semantics feature to obtain the text eigenvector of a preset dimension.

The text semantics extraction network may be a pre-trained deep neural network model. The text semantics extraction network includes at least two layers of network structures, configured to extract various feature representations such as a word vector, a text vector, and a location vector of the description text.

After obtaining the description text of the to-be-processed content, the computer device inputs the description text into the text semantics extraction network included in the click-through rate estimation model. A semantics feature is extracted from the description text based on the text semantics extraction model to obtain the text semantics feature of the description text. The text semantics extraction network further encodes the text semantics feature to obtain a text eigenvector of a preset dimension.

For example, the text semantics extraction network may extract the text semantics feature by using a metamodel based on the BERT model. Besides, the text semantics feature may also be extracted by using a metamodel based on the LSTM model or the CNN model. This is not limited herein.

A text semantics extraction network based on the BERT model is used as an example. After inputting the description text into the click-through rate estimation model, the computer device inputs the description text into the text semantics extraction network. The text semantics extraction network may convert each word of the description text into a one-dimensional vector as a model input. The text semantics extraction network further learns and extracts a text vector to obtain global semantics information of the description text and combine the global semantics information with semantics information of each word or phrase. Because each word or phrase carries different semantics information in different locations of the text, the text semantics extraction network further extracts location vectors corresponding to a word or a phrase in different locations. A self-attention mechanism network in the text semantics extraction network enhances a semantics vector representation based on a word vector, a phrase vector, and a location vector, and then outputs the text eigenvector of the preset dimension through an encoding layer of the text semantics extraction network. For example, the encoding layer may be a fully connected layer, and a text eigenvector representation of a preset dimension (for example, 1024 dimensions or 2048 dimensions) may be outputted according to a network structure of the fully connected layer.

In this embodiment, a semantics feature is extracted from the description text through the text semantics extraction network of the click-through rate estimation model. In this way, a semantics information representation of the description text of the to-be-processed content can be accurately and effectively obtained.

In an embodiment, the performing feature extraction on the image based on image semantics to obtain an image eigenvector includes: extracting an image semantics feature from the image through the image semantics extraction network; and encoding the image semantics feature to obtain the image eigenvector of a preset dimension.

The image semantics extraction network may be a pre-trained deep neural network model, and specifically may be a neural network model based on an image classification task.

After obtaining the image included in the to-be-processed content, the computer device inputs the image into the image semantics extraction network included in the click-through rate estimation model. The image semantics feature is extracted from the image based on the image semantics extraction model to obtain the image semantics feature of the image. The image semantics extraction network further encodes the image semantics feature to obtain the image eigenvector of a preset dimension.

For example, the image semantics extraction network may extract the text semantics feature by using a metamodel based on the ResNet model. Besides, the image semantics feature may also be extracted from the image by using a metamodel based on the LSTM model or the CNN model. This is not limited herein.

The image semantics extraction network based on the ResNet model is used as an example. The ResNet model can be obtained by pre-training by using an ImageNet dataset based on massive classified image data, and is used as the image semantics extraction network. The computer device inputs the image into the image semantics extraction network of the click-through rate estimation model. The image semantics extraction network includes at least two convolutional layers configured to extract image feature representations. Each layer of neural network in the image semantics extraction network extracts an image feature from the image. Specifically, a stacked layer in the image semantics extraction network may fit residual mapping to obtain a category semantics feature representation of the image. The fully connected network in the image semantics extraction network further encodes the image semantics feature and outputs an image semantics eigenvector of a preset dimension. The preset dimension is determined by a fully connected network of the encoding layer. For example, the preset dimension may be 1024 dimensions or 2048 dimensions. The image semantics extraction network based on the ResNet model may learn various feature representations of the image in an in-depth manner, so that an image semantics feature representation of the image can be accurately extracted.

In an embodiment, the combining the text eigenvector with the image eigenvector to obtain an image-text multi-modal vector includes: combining the text eigenvector with the image eigenvector through a feature connection layer included in the click-through rate estimation model to obtain the image-text multi-modal vector. Generating an estimated click-through rate of the to-be-processed content according to the image-text multi-modal vector includes: inputting the image-text multi-modal vector into an estimation layer included in the click-through rate estimation model, and generating the estimated click-through rate of the to-be-processed content through the estimation layer according to the image-text multi-modal vector.

After obtaining the description text of the to-be-processed content and the image included in the to-be-processed content, the computer device extracts the text semantics feature from the description text to obtain the corresponding text eigenvector, and extracts the image semantics feature from the image to obtain the corresponding image eigenvector. The computer device then combines the text eigenvector with the image eigenvector through a feature connection layer included in the click-through rate estimation model to obtain the image-text multi-modal vector of the to-be-processed content. The computer device further inputs the image-text multi-modal vector into an estimation layer included in the click-through rate estimation model, and estimates the click-through rate of the to-be-processed content through the estimation layer according to the image-text multi-modal vector to obtain the estimated click-through rate corresponding to the to-be-processed content.

Figure 4:
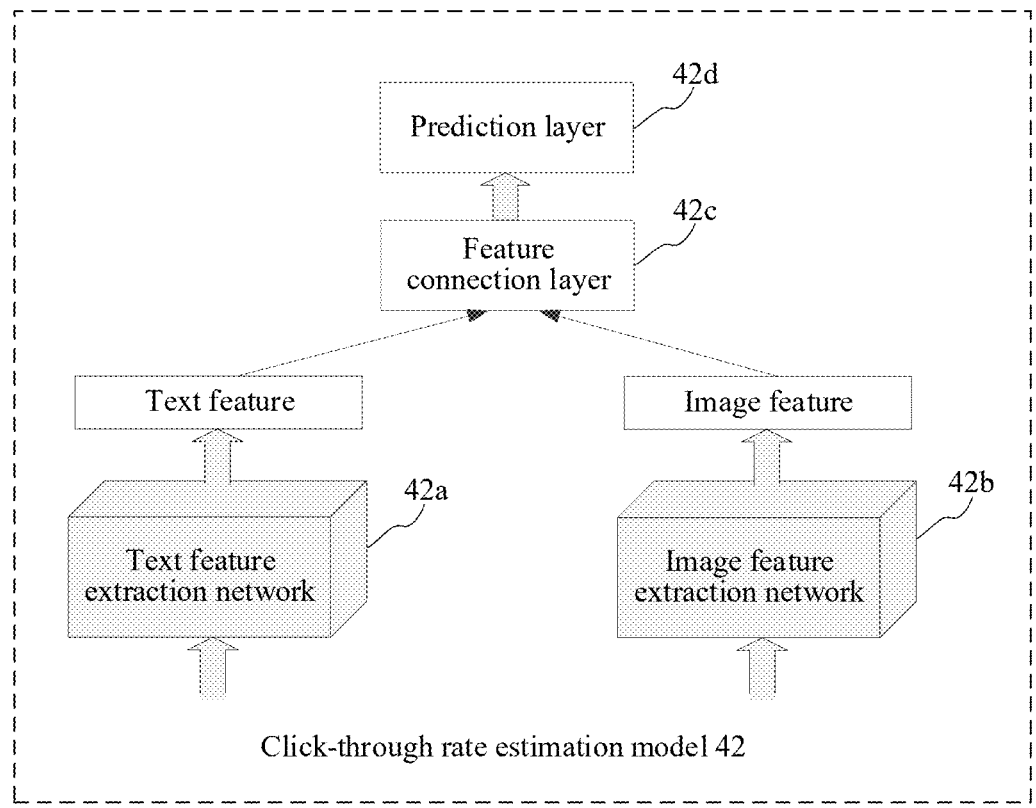
FIG. 4 is a schematic diagram of a model structure of a click-through rate estimation model according to an embodiment of this disclosure.

Specifically, the click-through rate estimation model includes the text semantics extraction network and the image semantics extraction network, and further includes a feature connection layer, configured to perform feature combination on the text semantics eigenvector and the image semantics eigenvector respectively extracted by the text semantics extraction network and the image semantics extraction network. The click-through rate estimation model further includes an estimation layer, configured to estimate a click-through rate of the to-be-processed content according to the image-text multi-modal vector. For example, FIG. 4 is a schematic diagram of a model structure of a click-through rate estimation model according to an embodiment. A click-through rate estimation model 42 shown in FIG. 4 includes a text semantics extraction network 42a, an image semantics extraction network 42b, a feature connection layer 42c, and an estimation layer 42d. The text semantics extraction network is configured to extract a text feature, and the image semantics extraction network is configured to extract an image feature.

The text semantics extraction network and the image semantics extraction network of the click-through rate estimation model are model structures independent of each other, and may be respectively used as input channels of the model and respectively process inputted data accordingly.

After obtaining the description text of the to-be-processed content and the image included in the to-be-processed content, the computer device may directly input the description text into the text semantics extraction network of the click-through rate estimation model, and at the same time input the image included in the to-be-processed content into the image semantics extraction network. The text semantics extraction network and the image semantics extraction network process the description text and the image respectively to respectively obtain the text eigenvector and the image eigenvector. Then, the text eigenvector and the image eigenvector are inputted into the feature connection layer for feature combination to obtain the image-text multi-modal vector of the to-be-processed content. The feature connection layer inputs the outputted image-text multi-modal vector into the estimation layer, and the estimation layer performs regression estimation on the click-through rate of the to-be-processed content according to the image-text multi-modal vector to obtain the estimated click-through rate of the to-be-processed content. The text semantics model and the image semantics model are introduced to construct the click-through rate estimation model to effectively capture relationships between the semantics of the description text and the click-through rate and between the image semantics and the click-through rate. In this way, the click-through rate of the to-be-processed content can be accurately estimated. Therefore, during recommendation of the to-be-processed content according to the estimated click-through rate, inconsistency between image content and text content of the to-be-processed content can be effectively alleviated, and recommendation quality and recommendation efficiency of quality to-be-processed content can be effectively improved.

Figure 5:
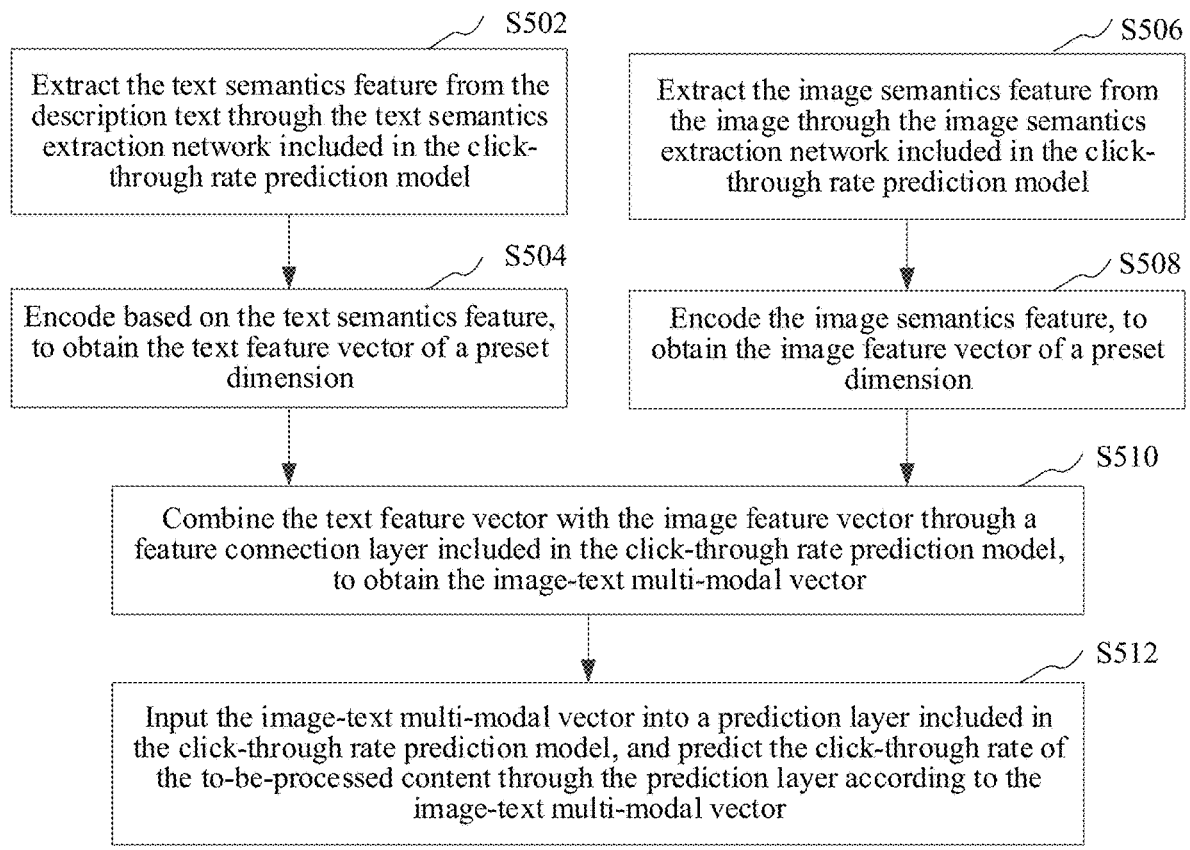
FIG. 5 is a schematic flowchart of steps of processing to-be-processed content based on a click-through rate estimation model according to an embodiment of this disclosure.

In an embodiment, as shown in FIG. 5, steps of processing to-be-processed content based on a click-through rate estimation model include:

S502: Extract the text semantics feature from the description text through the text semantics extraction network included in the click-through rate estimation model.

S504: Encode based on the text semantics feature to obtain the text eigenvector of a preset dimension.

S506: Extract the image semantics feature from the image through the image semantics extraction network included in the click-through rate estimation model.

S508: Encode the image semantics feature to obtain the image eigenvector of a preset dimension.

S510: Combine the text eigenvector with the image eigenvector through a feature connection layer included in the click-through rate estimation model to obtain the image-text multi-modal vector.

S512: Input the image-text multi-modal vector into an estimation layer included in the click-through rate estimation model, and estimate the click-through rate of the to-be-processed content through the estimation layer according to the image-text multi-modal vector.

In a specific embodiment, the click-through rate estimation model includes the text semantics model, the image semantics model, the feature connection layer, and the estimation layer. The text semantics model is a pre-trained BERT model, and the image semantics model is a pre-trained ResNet model. The computer device may introduce, according to training samples obtained in advance, a BERT text semantics model and a ResNet image semantics model that are already trained to train the click-through rate estimation model. The BERT model and the ResNet model may be respectively used as encoders in the click-through rate estimation model to respectively extract a text feature encoding vector corresponding to the description text and an image feature encoding vector corresponding to the image. Further, the feature connection layer included in the pre-trained click-through rate estimation model performs feature combination on the text feature encoding vector and the image feature encoding vector to obtain the image-text multi-modal vector of the to-be-processed content. Then, the estimation layer of the click-through rate estimation model performs regression prediction on the click-through rate of the to-be-processed content according to the image-text multi-modal vector to obtain the estimated click-through rate of the to-be-processed content.

Figure 6:
FIG. 6 is a schematic diagram of video content according to a specific embodiment of this disclosure.
Figure 6:
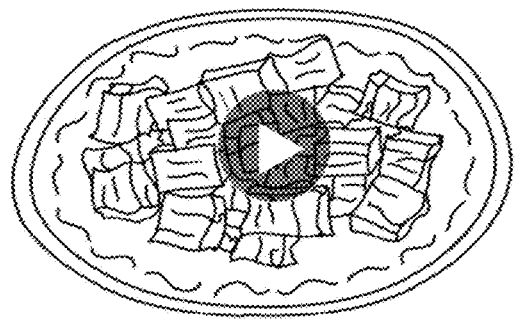
Figure 6:
Figure 6:
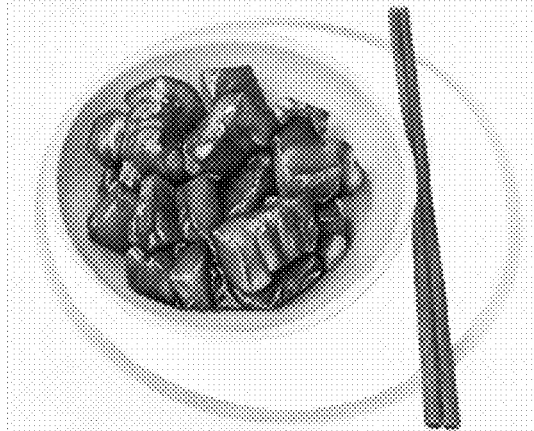

For example, the to-be-processed content is video content. A description text of the video content is usually a title of the video content. In a video content search scenario, video content is usually displayed in the form of a video title and a thumbnail of a key frame image. Therefore, a suitable key frame image usually better helps improve the accuracy of click-through rate estimation. For example, the video content is related to tutorial on braised pork. FIG. 6 is a schematic diagram of video content in a specific example.

As shown in FIG. 6, video content (a), video content (b), video content (c), and video content (d) are displayed. The video content (a), the video content (b), the video content (c), and the video content (d) respectively include corresponding title content and a corresponding cover image. The title content in the video content (a) in FIG. 6 is about "braised pork", but the cover image does not show content related to "braised pork". The title content in the video content (c) is information about "braised pork", but the cover image shows content related to "chicken wings and legs". As can be seen from this, in the video content (a) and the video content (c), the title content is weakly associated with the image content in the cover images. In the video content (b) and the video content (d), the title content and content in the cover images are all information about "braised pork". Generally, the video content displayed in the video content (b) and the video content (d) can better attract users to click. In the video content (a) and the video content (c), the content indicated by the video titles and the cover images is inconsistent, and the images may not correspond to the texts. Generally, a click-through rate of this type of video content is not high.

Figure 7:
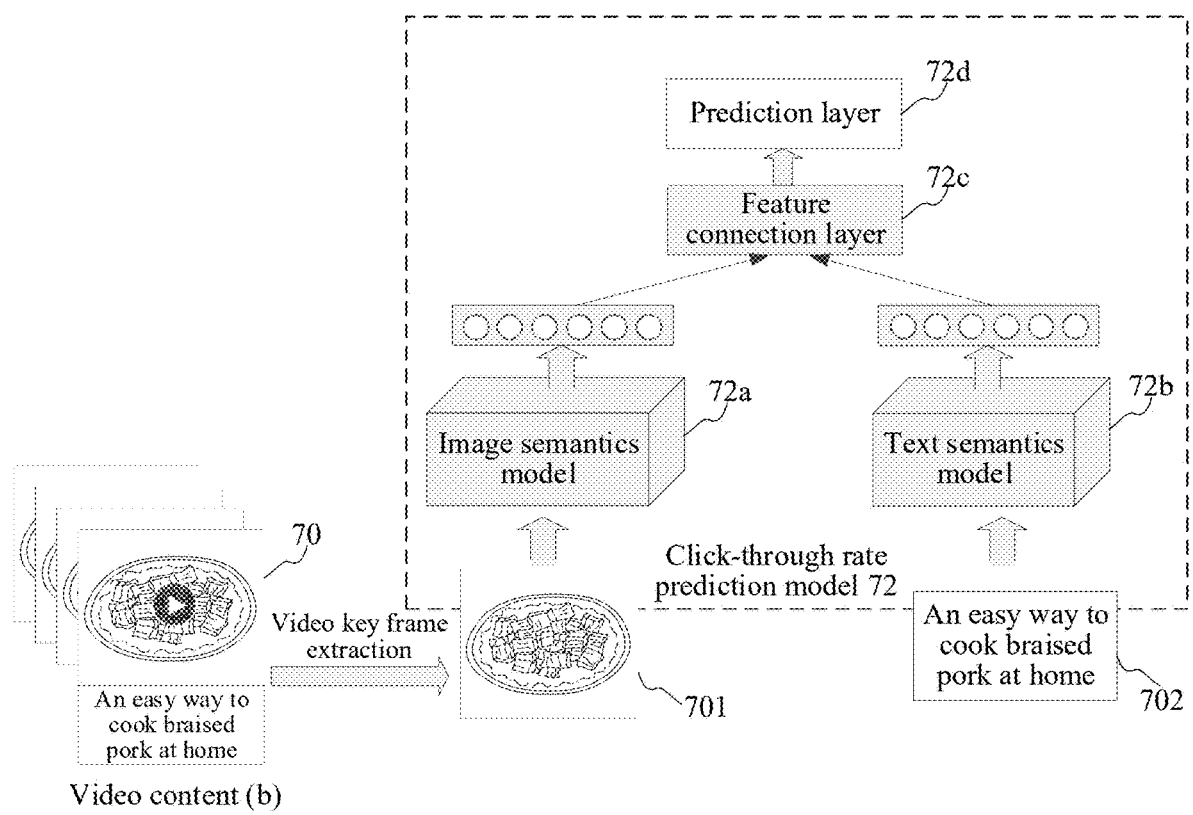
FIG. 7 is a schematic flowchart of generating an estimated click-through rate of video content based on a click-through rate estimation model according to a specific embodiment of this disclosure.

FIG. 7 is a schematic diagram of generating an estimated click-through rate of video content based on a click-through rate estimation model according to an embodiment, and is a schematic diagram of processing the video content (b) in FIG. 6. As shown in FIG. 7, content indicated by the video content (b) 70 is a way of cooking braised pork, and the title of the video content is "an easy way to cook braised pork at home". After obtaining the video content, the computer device extracts a key frame image 701 from the video content and obtains a title 702 of the video content. The computer device then inputs the title of the video content 70 into a text semantics model 72a included in a click-through rate estimation model 72, and inputs the key frame image extracted from the video content into an image semantics model 72b included in the click-through rate estimation model 72. Then, after the text eigenvector of the video content is obtained based on the text semantics model 72a and the image eigenvector of the video content is obtained based on the image semantics model 72b, the text eigenvector and the image eigenvector are respectively inputted into the feature connection layer 72c for feature combination to obtain the image-text multi-modal vector of the video content. The click-through rate estimation model then inputs the obtained image-text multi-modal vector into the estimation layer 72d for click-through rate estimation to obtain the estimated click-through rate of the video content.

Because the title and the key frame image in video content are usually key information indicated by the video content, relationships between the semantics of the title text and the click-through rate and between the image semantics of the key frame image and the click-through rate are captured based on the click-through rate estimation model including the text semantics model and the image semantics model, so that the click-through rate of the video content can be accurately estimated. Therefore, during recommendation of content according to the estimated click-through rate, visual impact of the video image on users may be effectively used. Besides, inconsistency between image content and text content of the video content can be effectively alleviated, that is, title content does not correspond to image content in the video. This can effectively improve recommendation precision and recommendation efficiency of quality video content.

In an embodiment, the content processing method is performed by the click-through rate estimation model. The click-through rate estimation model is obtained through training in training operations, and training operations include: obtaining a content sample and a training label of the content sample; where the content sample includes a description text of history content and an image included in the history content; and the training label is a history click-through rate of the history content; and training the click-through rate estimation model based on the content sample and the training label.

In this embodiment, the content processing method is performed by the click-through rate estimation model. The click-through rate estimation model is obtained by training based on content sample data. Before content is processed based on the click-through rate estimation model, the click-through rate estimation model needs to be pre-trained.

A content sample may be history content within a history time period, and the content sample includes a description text of history content and an image included in the history content, that is, impression history content of a past time period. The history content includes a real history click-through rate in a history time period. In a process of training the click-through rate estimation model, history content is used as a content sample for training, and a history click-through rate of the history content is used as a training label. The training label is used to perform processing such as adjust the parameter of each training result to further train and optimize the click-through rate estimation model.

The content sample may be obtained from a preset sample library, or may be obtained from various platforms, for example, is history content posted or shared in a social network, a video sharing network, a community forum, a blog, or the like. The content sample may include article content, image-text content, video content, web page content, and the like of the description text and the image.

Specifically, after obtaining the content sample, the computer device inputs a description text of history content in the content sample and an image included in the history content into a preset click-through rate estimation model for training, and adjusts a parameter of the click-through rate estimation model and optimizes the click-through rate estimation model based on the training label to obtain, by training, the click-through rate estimation model that satisfies a condition.

Figure 8:
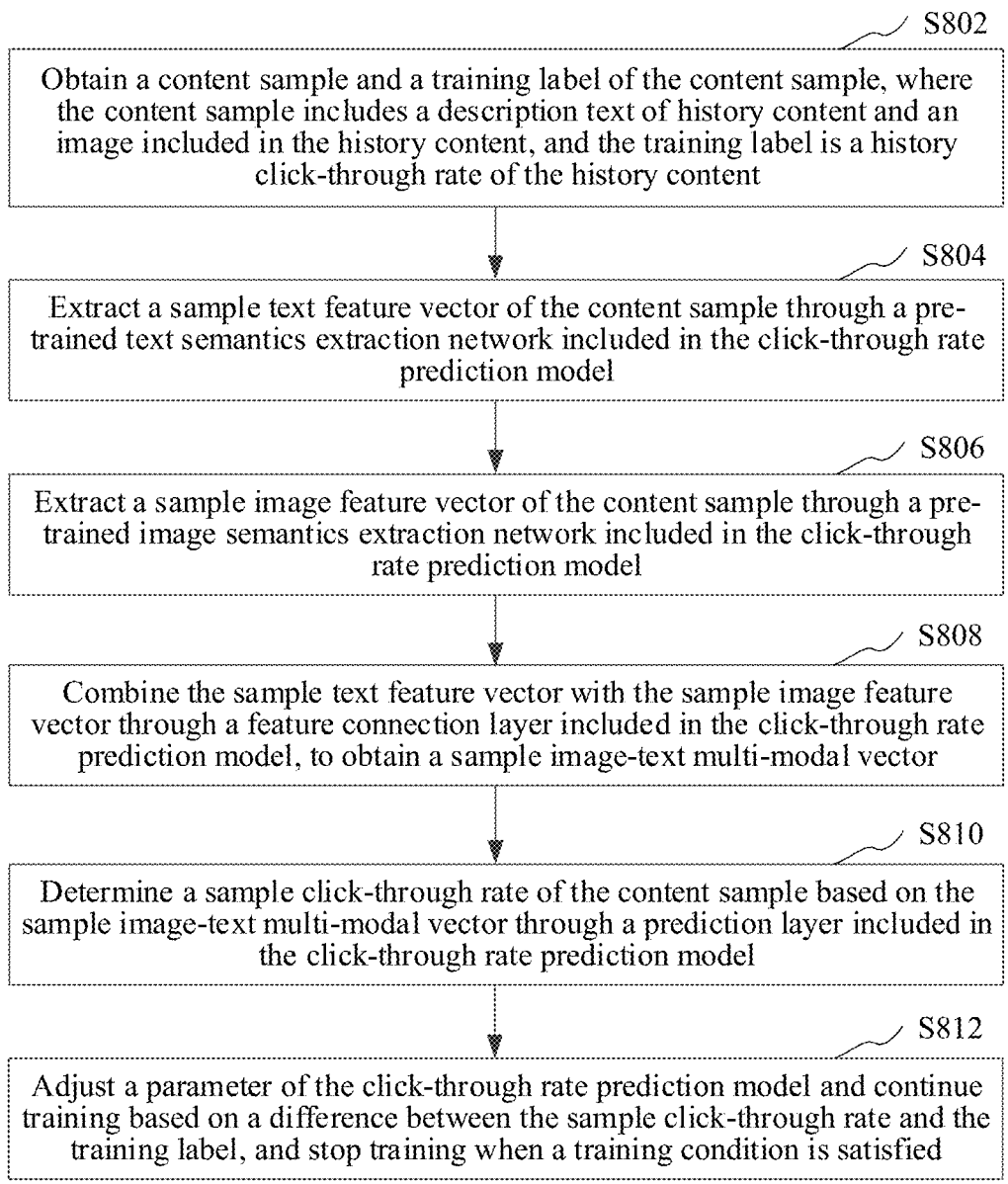
FIG. 8 is a schematic flowchart of training operations of a click-through rate estimation model according to an embodiment of this disclosure.

In an embodiment, as shown in FIG. 8, training operations of a click-through rate estimation model include:

S802: Obtain a content sample and a training label of the content sample. The content sample includes a description text of history content and an image included in the history content. The training label is a history click-through rate of the history content.

S804: Extract a sample text eigenvector of the content sample through a pre-trained text semantics extraction network included in the click-through rate estimation model.

S806: Extract a sample image eigenvector of the content sample through a pre-trained image semantics extraction network included in the click-through rate estimation model.

S808: Combine the sample text eigenvector with the sample image eigenvector through a feature connection layer included in the click-through rate estimation model to obtain a sample image-text multi-modal vector.

S810: Determine a sample click-through rate of the content sample based on the sample image-text multi-modal vector through an estimation layer included in the click-through rate estimation model.

S812: Adjust a parameter of the click-through rate estimation model and continue training based on a difference between the sample click-through rate and the training label, and stop training in a case that a training condition is satisfied.

The click-through rate estimation model includes a pre-trained text semantics extraction network and a pre-trained image semantics extraction network. Specifically, the text semantics extraction network and the image semantics extraction network may be used as an encoder layer of the click-through rate estimation model respectively. A parameter of the image semantics extraction network is fixed. A parameter of the text semantics extraction network may also be fixed. In an embodiment, the parameter of the text semantics extraction network may further be subjected to transfer learning in the process of training the click-through rate estimation model to fine-tune the parameter.

After inputting the description text of the history content and the image included in the history content into the preset click-through rate estimation model, the computer device extracts a sample text eigenvector of the content sample through a pre-trained text semantics extraction network included in the click-through rate estimation model. Besides, the computer device extracts a sample image eigenvector of the content sample through a pre-trained image semantics extraction network included in the click-through rate estimation model. The computer device further combines the sample text eigenvector with the sample image eigenvector through a feature connection layer of the click-through rate estimation model to obtain a sample image-text multi-modal vector. The connection layer may combine the vectors in a Concat manner.

The computer device inputs the obtained sample image-text multi-modal vector into the estimation layer included in the click-through rate estimation model; and performs regression estimation on the sample click-through rate of the content sample based on the sample image-text multi-modal vector. Further, the computer device adjusts a parameter of the click-through rate estimation model and continues training based on a difference between the sample click-through rate and the training label, and stops training in a case that a training condition is satisfied.

The difference between the sample click-through rate and the training label may be measured by a loss function. For example, a mean absolute error (MAE) function, a smooth mean absolute error (Huber loss) function, or a cross entropy loss function may be selected as the loss function. The training condition is a condition for ending model training. The condition for ending training may be that a preset number of iterations is satisfied, or may be that a performance estimation indicator of the click-through rate estimation model after parameter adjustment satisfies a preset indicator.

Specifically, an MSE function may be used as the final loss function and a specific formula is as follows:

$$\sqrt{\text{loss} = \Sigma_{k=0}^{n} \|x_k - y_k\|_2}.$$

$x_k$ is the estimated sample click-through rate, $y_k$ is the history click-through rate of the training label, n is a quantity of samples, and k is a number of each sample.

The computer device extracts the text eigenvector of the description text in the content sample through the pre-trained text semantics extraction network, and may quickly and accurately obtain the text semantics of the content sample, and extracts the sample image eigenvector of the content sample in the image through the pre-trained image semantics extraction network, and may quickly and accurately obtain the image semantics of the content sample. The computer device performs click-through rate estimation training on the extracted text eigenvector and sample image eigenvector based on the click-through rate estimation model to be trained to obtain the sample click-through rate. The computer device may further adjust the parameter in the click-through rate estimation model step by step according to the difference between the obtained sample click-through rate and the training label. In this way, in the parameter adjustment process, the click-through rate estimation model may capture the implicit relationship between the sample content and the click-through rate based on both the text semantics and the image semantics. The click-through rate of the to-be-processed content is estimated based on the click-through rate estimation model under the dual guidance of the text semantics feature and the image semantics feature, thereby improving the accuracy of generating the estimated click-through rate of the content.

In a specific embodiment, the content sample may be history video content, and the history video content includes a video title, a video key frame, and a history click-through rate of the video content. The video title is used as the description text of the content sample, the video key frame is used as the image included in the content sample, and the history click-through rate of the video content is used as the training label. Then, the content sample is inputted into the click-through rate estimation model for training. In the training process, the click-through rate estimation model may be trained through regression estimation. In this way, modeling may be implemented according to the implicit relationship between video title semantics and the click-through rate and between key frame image semantics and the click-through rate to effectively capture the relationship between the video title semantics and the click-through rate and between the key frame image semantics and the click-through rate. Therefore, the click-through rate estimation model may be trained under the dual guidance of the text semantics and the image semantics, thereby improving the accuracy of generating the estimated click-through rate of the content based on the click-through rate estimation model.

In this way, the click-through rate of the content is estimated based on the image-text multi-modal vector that includes the text semantics and the image semantics. This can effectively alleviate inconsistency between image content and text content of shared content, thereby effectively improving the accuracy of generating the estimated click-through rate of quality shared content. During recommendation of the content according to the estimated click-through rate, the impression rate of quality content and recommendation efficiency of quality content can be effectively improved.

Figure 9:
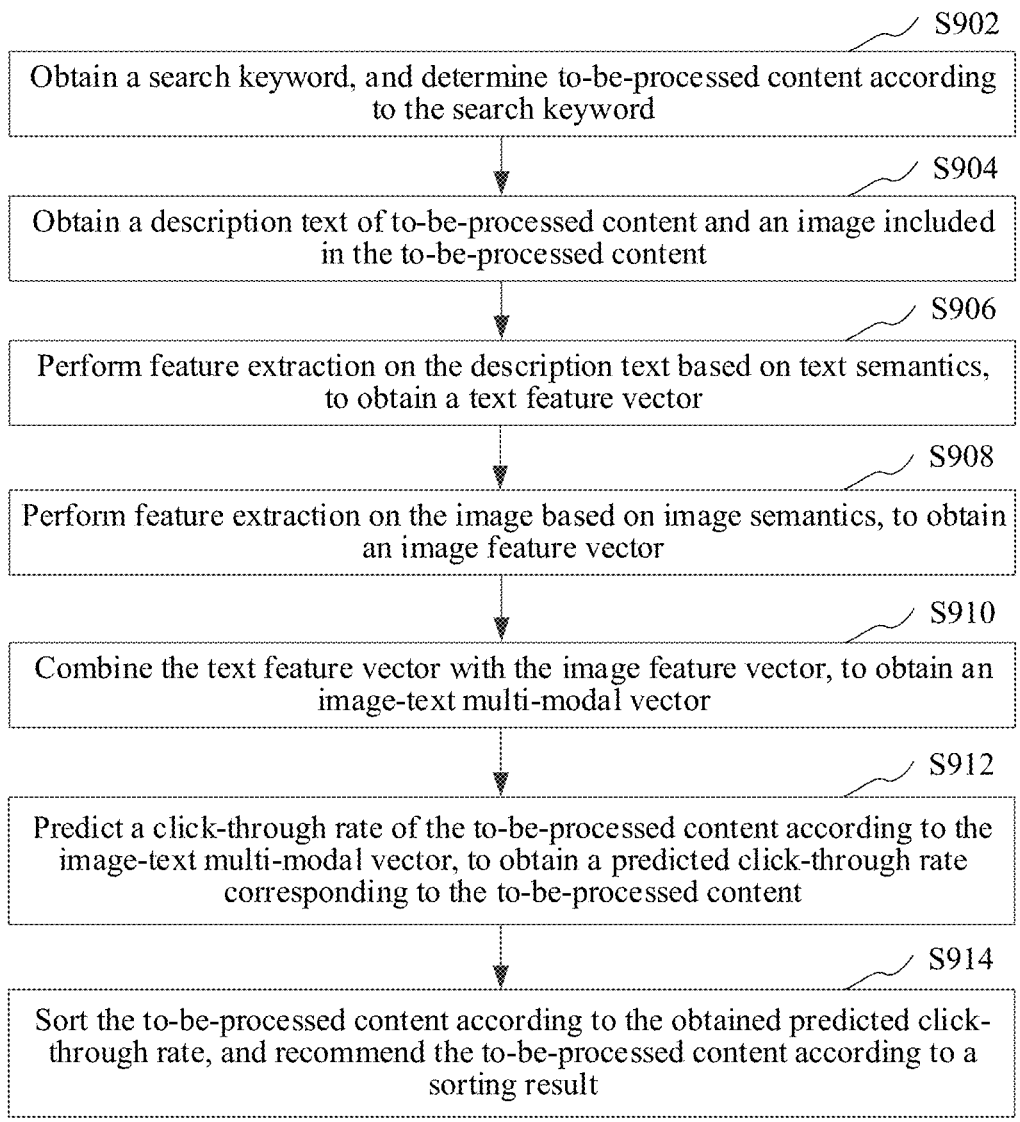
FIG. 9 is a schematic flowchart of a content processing method according to another embodiment of this disclosure.

In an embodiment, as shown in FIG. 9, a content processing method is provided, including the following steps:

S902: Obtain a search keyword, and determine to-be-processed content according to the search keyword.

S904: Obtain a description text of to-be-processed content and an image included in the to-be-processed content.

S906: Perform feature extraction on the description text based on text semantics to obtain a text eigenvector.

S908: Perform feature extraction on the image based on image semantics to obtain an image eigenvector.

S910: Combine the text eigenvector with the image eigenvector to obtain an image-text multi-modal vector.

S912: Estimate a click-through rate of the to-be-processed content according to the image-text multi-modal vector to obtain an estimated click-through rate corresponding to the to-be-processed content.

S914: Sort the to-be-processed content according to an estimated click-through rate, and recommend the to-be-processed content according to a sorting result.

The search keyword may be a keyword carried based on a query request. For example, when the user searches for the to-be-processed content through a search engine, information content entered by the user for search is the search keyword.

Generally, statistical information such as history impressions and clicks is all important features in rough and fine sorting processes and plays a key role. Generally, content that recently has been exposed and clicked for multiple times is more likely to be preferentially exposed again in sorting.

A user may initiate a query request on a content sharing platform based on a search keyword through a terminal. After obtaining the search keyword, the computer device determines the to-be-processed content for recommendation according to the search keyword. Then, the computer device obtains the description text of the to-be-processed content and the image included in the to-be-processed content, and performs feature extraction on the description text based on the text semantics to effectively obtain the text eigenvector corresponding to the description text. The computer device performs feature extraction on the image based on the image semantics to effectively obtain the image eigenvector corresponding to the image. The computer device performs feature combination on the text eigenvector and the image eigenvector to effectively obtain the image-text multi-modal vector including the text semantics and the image semantics. Further, the computer device estimates the click-through rate of the to-be-processed content according to the obtained image-text multi-modal vector. In this way, the click-through rate can be accurately and effectively estimated based on the text semantics and the image semantics of the to-be-processed content to obtain an accurate and appropriate estimated click-through rate.

The computer device then sorts, according to the corresponding estimated click-through rate, the to-be-processed content to be recommended, and recommends the to-be-processed content according to a sorted result. Specifically, the computer device may sort to-be-processed content in descending order of estimated click-through rates of to-be-processed content. In this way, content with a higher estimated click-through rate can be effectively displayed in the front to effectively display quality content in a location that is most likely to be exposed and clicked by users. Content with a lower estimated click-through rate is ranked in a rear location of a recommendation sequence. This can effectively alleviate inconsistency between image content and text content of to-be-recommended content. In this way, when content is recommended according to the estimated click-through rate, recommendation quality and recommendation efficiency of quality content can be effectively improved.

In an embodiment, a history click-through rate of the to-be-processed content is obtained according to history impression information in a case that the to-be-processed content includes the history impression information; and the to-be-processed content is sorted according to the estimated click-through rate and the history click-through rate.

The to-be-processed content of existing history impression information also includes the estimated click-through rate determined through the foregoing method. The computer device determines, according to the search keyword, the to-be-processed content to be recommended, and estimates the click-through rate of the to-be-processed content according to the image-text multi-modal vector of the to-beprocessed content to obtain the corresponding estimated click-through rate. If some pieces of to-be-processed content carry history impression information, history click-through rates of these pieces of to-be-processed content are obtained according to the history impression information, a recommendation sequence of these pieces of to-be-processed content is determined according to estimated click-through rates and the history click-through rates, and these pieces of to-be-processed content are ranked according to the recommendation sequence. If these pieces of to-be-processed content do not carry history impression information, the recommendation sequence of these pieces of to-be-processed content is determined directly according to the estimated click-through rates to obtain the recommendation sequence corresponding to these piece of to-be-processed content to be recommended, and these pieces of to-be-processed content are ranked and recommended according to the recommendation sequence. Recommendation is implemented based on the estimated click-through rate and the true history click-through rate of the to-be-processed content to effectively promote further impression of to-be-processed quality content. The impression rate of to-be-processed quality content that previously has no impression can be effectively increased based on the estimated click-through rate to effectively improve recommendation efficiency of the to-be-processed quality content.

Figure 10:
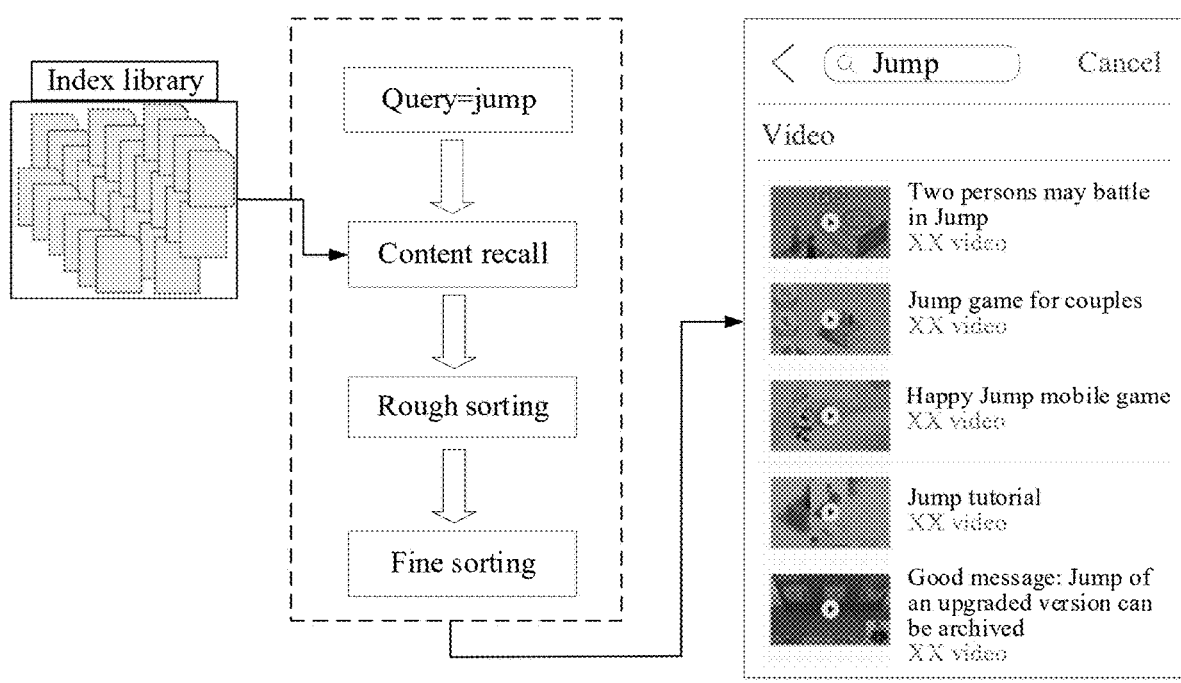
FIG. 10 is a schematic diagram of a content search procedure and a recommendation result according to an embodiment of this disclosure.

For example, FIG. 10 is a schematic diagram of recommending to-be-processed content according to a specific embodiment. A schematic flowchart of searching for the to-be-processed content and a schematic diagram of an interface of a recommendation result are included. For example, based on a search engine of the to-be-processed content, during search, at least two rounds of sorting are usually performed, that is, rough sorting and fine sorting. The first round is usually rough sorting. A part of a huge data set is extracted based on a simple rule, and then this part participates in the second round of fine sorting. In the process of fine sorting, sorting may be performed based on an estimated click-through rate and a history click-through rate of the to-be-processed content. For example, a large amount of to-be-processed content is stored in an index library. When a user searches for to-be-processed content, in response to a query of the user, for example, when the user initiates a query request based on a search keyword, the computer device first recalls to-be-processed content for recommendation from the index library according to the search keyword, and sorts the obtained to-be-processed content in multiple rounds. The computer device may first perform rough sorting on the to-be-processed content according to a preset sorting rule, then perform fine sorting based on an estimated click-through rate determined according to an image-text multi-modal vector of the to-be-processed content, and then recommend the to-be-processed content according to a sorting result and display the to-be-processed content on a user terminal. In this way, quality content can be effectively displayed in a location that is easily clicked by users, thereby effectively enhancing impression opportunities of quality content, and effectively improving recommendation quality and recommendation efficiency of quality content.

Figure 11:
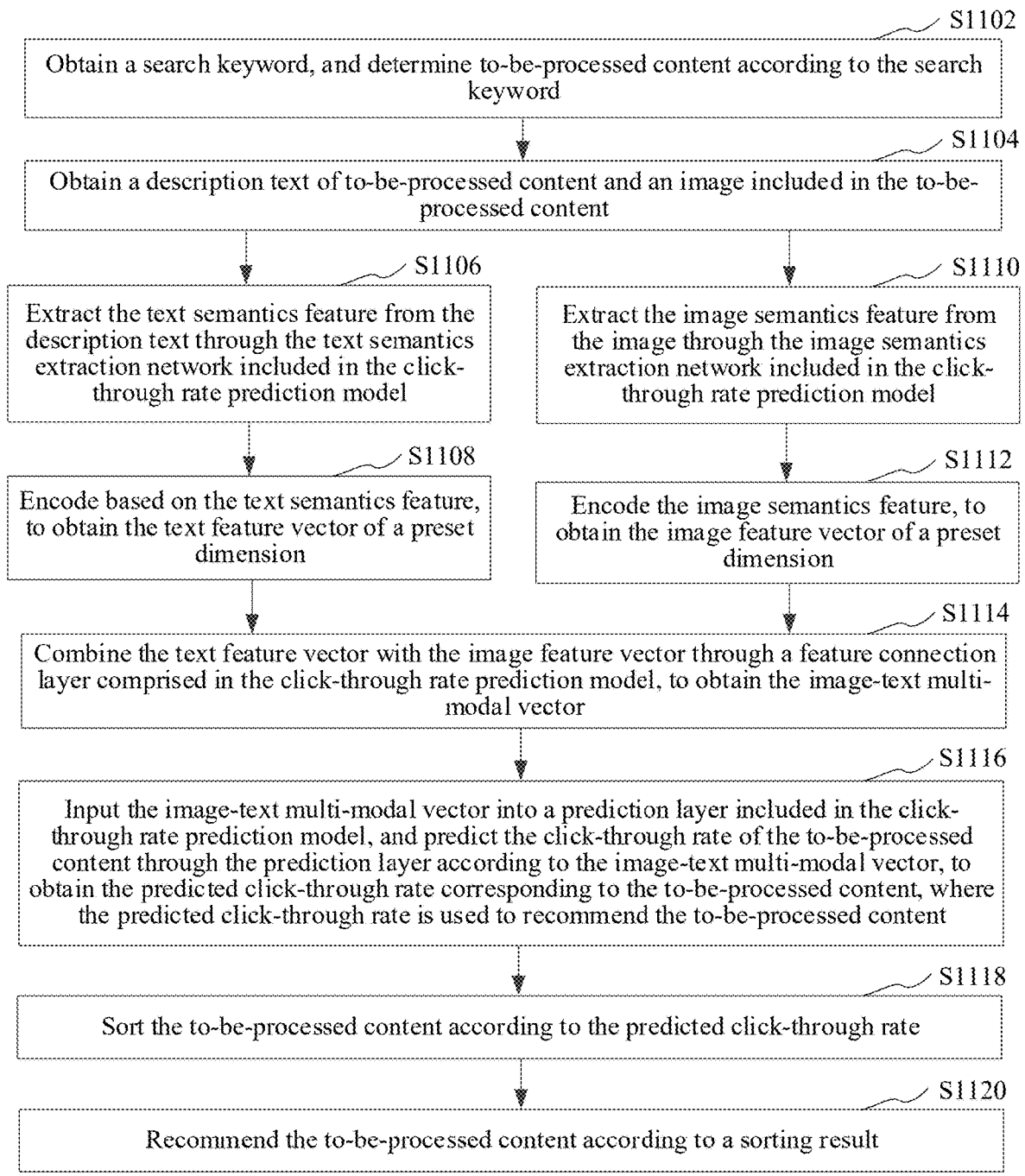
FIG. 11 is a schematic flowchart of a content processing method according to a specific embodiment of this disclosure.

In a specific embodiment, as shown in FIG. 11, a content processing method is provided, including the following steps:

S1102: Obtain a search keyword, and determine to-be-processed content according to the search keyword.

S1104: Obtain a description text of to-be-processed content and an image included in the to-be-processed content.

S1106: Extract the text semantics feature from the description text through the text semantics extraction network included in the click-through rate estimation model.

S1108: Encode based on the text semantics feature to obtain the text eigenvector of a preset dimension.

S1110: Extract the image semantics feature from the image through the image semantics extraction network included in the click-through rate estimation model.

S1112: Encode the image semantics feature to obtain the image eigenvector of a preset dimension.

S1114: Combine the text eigenvector with the image eigenvector through a feature connection layer included in the click-through rate estimation model to obtain the image-text multi-modal vector.

S1116: Input the image-text multi-modal vector into an estimation layer included in the click-through rate estimation model, and estimate the click-through rate of the to-be-processed content through the estimation layer according to the image-text multi-modal vector to obtain the estimated click-through rate corresponding to the to-be-processed content. The estimated click-through rate is used to recommend the to-be-processed content.

S1118: Sort the to-be-processed content according to the estimated click-through rate.

S1120: Recommend the to-be-processed content according to a sorting result.

In this embodiment, the click-through rate estimation model obtained by training the text semantics model and the image semantics model is introduced, and the click-through rate of the to-be-processed content is estimated based on the image-text multi-modal vector obtained based on the text semantics and the image semantics to effectively capture relationships between the semantics of the description text and the click-through rate and between the image semantics and the click-through rate. In this way, the click-through rate of the to-be-processed content can be accurately estimated. Therefore, during recommendation of the to-be-processed content according to the estimated click-through rate, inconsistency between image content and text content of the to-be-recommended content can be effectively alleviated, and recommendation quality and recommendation efficiency of quality content can be effectively improved.

This disclosure further provides an application scenario. The application scenario is applied to the content processing method to estimate a click-through rate of shared content posted or shared on various content sharing platforms (for example, social networks, video sharing networks, community forums, and blogs). Specifically, the user may post various shared content on a content sharing platform, and the to-be-processed content may be shared content posted by the user. After obtaining new shared content posted on a content sharing platform, the computer device obtains a description text of shared content and an image included in the shared content, and performs feature extraction on the description text based on text semantics to obtain a text eigenvector corresponding to the description text. The computer device performs feature extraction on the image based on image semantics to obtain an image eigenvector corresponding to the image. The computer device performs feature combination on the text eigenvector and the image eigenvector to effectively obtain the image-text multi-modal vector including the text semantics and the image semantics. The computer device further determines the estimated click-through rate of the shared content according to the obtained image-text multi-modal vector. The estimated click-through rate may be used to subsequently promote, search for, and rank the shared content or the like to effectively increase the impression rate of quality shared content.

This disclosure further provides an application scenario. The application scenario is applied to the foregoing content processing method and is applied to a content search scenario. A video sharing network platform is used as an example. A user may search for content of interest on a video application platform. The video application platform may also be a video application sub-program in a social application program, and the to-be-processed content is to-be-recommended video content. Specifically, after the user initiates a search request based on a keyword on a corresponding user terminal, a server corresponding to the video application platform obtains matched to-be-recommended video content according to a keyword carried in the search request, further obtains a description text of the video content and an image included in the video content, and performs feature extraction on the description text and the image based on text semantics and image semantics respectively to obtain a text eigenvector corresponding to the description text and an image eigenvector corresponding to the image. Features of the text eigenvector and the image eigenvector are combined to obtain an image-text multi-modal vector that includes the text semantics and the image semantics. The server further determines an estimated click-through rate of the video content according to the image-text multi-modal vector, sorts the to-be-pushed video content according to the estimated click-through rate, and then pushes the sorted video content to the user terminal. The video content is displayed on a display interface of the user terminal according to a sorting result. In this way, video content with a higher estimated click-through rate can be preferentially displayed to users, thereby effectively increasing impressions of quality video content.

It should be understood that steps in flowcharts of the FIG. 3, FIG. 5, FIG. 8, FIG. 9, and FIG. 11 are displayed in sequence based on indication of arrows, but the steps are not necessarily performed in sequence based on a sequence indicated by the arrows. Unless clearly specified in this specification, there is no strict sequence limitation on the execution of the steps, and the steps may be performed in another sequence. In addition, at least some steps in FIG. 3, FIG. 5, FIG. 8, FIG. 9, and FIG. 11 may include a plurality of steps or a plurality of stages. The steps or the stages are not necessarily performed at a same moment, and instead may be performed at different moments. A performing sequence of the steps or the stages is not necessarily performing in sequence, and instead may be performing in turn or alternately with another step or at least some of steps or stages of the another step.

Figure 12:
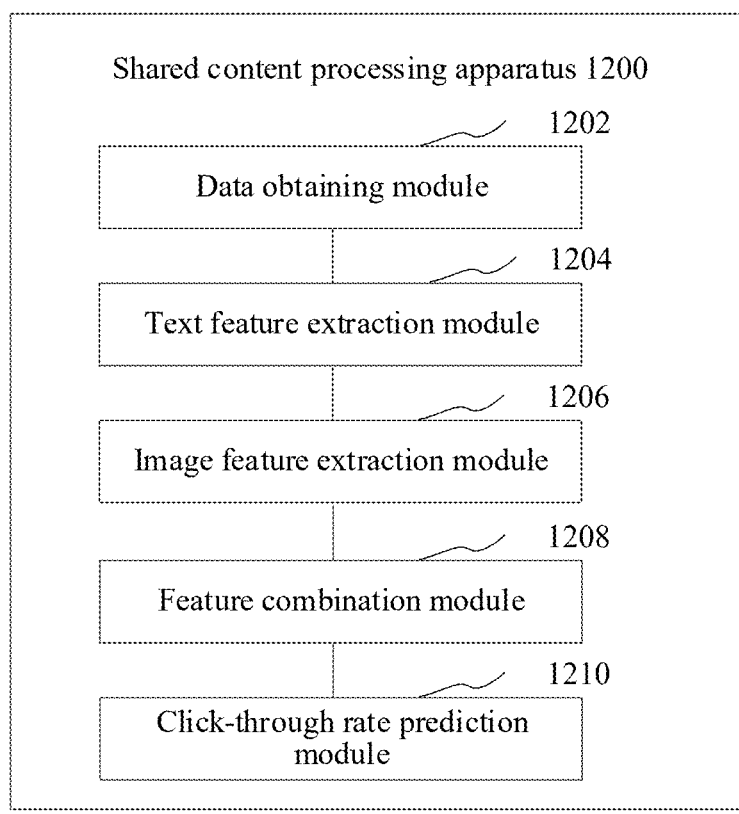
FIG. 12 is a structural block diagram of a content processing apparatus according to an embodiment of this disclosure.

In an embodiment, as shown in FIG. 12, a content processing apparatus 1200 is provided. The apparatus may use a software module or a hardware module or a combination thereof and becomes a part of a computer device. The apparatus specifically includes: a data obtaining module 1202, a text feature extraction module 1204, an image feature extraction module 1206, a feature combination module 1208, and a click-through rate estimation module 1210.

The data obtaining module 1202 is configured to obtain a description text of to-be-processed content and an image included in the to-be-processed content.

The text feature extraction module 1204 is configured to perform feature extraction on the description text based on text semantics to obtain a text eigenvector.

The image feature extraction module 1206 is configured to perform feature extraction on the image based on image semantics to obtain an image eigenvector.

The feature combination module 1208 is configured to combine the text eigenvector with the image eigenvector to obtain an image-text multi-modal vector.

The click-through rate estimation module 1210 is configured to estimate a click-through rate of the to-be-processed content according to the image-text multi-modal vector.

In an embodiment, the text eigenvector is extracted through a text semantics extraction network included in the click-through rate estimation model. The image eigenvector is extracted through an image semantics extraction network included in the click-through rate estimation model.

In an embodiment, the text feature extraction module 1204 is further configured to: extract the text semantics feature from the description text through the text semantics extraction network; and encode based on the text semantics feature to obtain the text eigenvector of a preset dimension.

In an embodiment, the image feature extraction module 1206 is further configured to: extract an image semantics feature from the image through the image semantics extraction network; and encode the image semantics feature to obtain the image eigenvector of a preset dimension.

In an embodiment, the feature combination module 1208 is further configured to combine the text eigenvector with the image eigenvector through a feature connection layer included in the click-through rate estimation model to obtain an image-text multi-modal vector. The click-through rate estimation module 1210 is further configured to: input the image-text multi-modal vector into an estimation layer included in the click-through rate estimation model, and estimate the click-through rate of the to-be-processed content through the estimation layer according to the image-text multi-modal vector.

Figure 13:
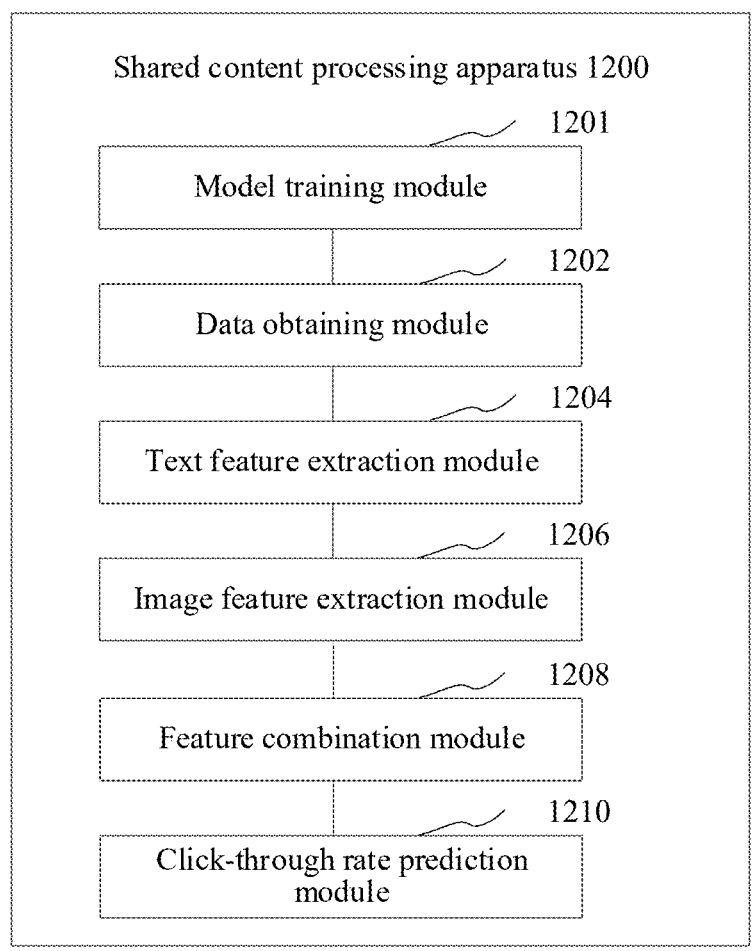
FIG. 13 is a structural block diagram of a content processing apparatus according to another embodiment of this disclosure.

In an embodiment, the content processing method is performed by the click-through rate estimation model. The click-through rate estimation model is obtained through training in training operations. As shown in FIG. 13, the content processing apparatus further includes a model training module 1201, configured to: obtain a content sample and a training label of the content sample, where the content sample includes a description text of history content and an image included in the history content; and the training label is a history click-through rate of the history content; and train the click-through rate estimation model based on the content sample and the training label.

In an embodiment, the model training module 1201 is further configured to: extract a sample text eigenvector of the content sample through a pre-trained text semantics extraction network included in the click-through rate estimation model; extract a sample image eigenvector of the content sample through a pre-trained image semantics extraction network included in the click-through rate estimation model; combine the sample text eigenvector with the sample image eigenvector through a feature connection layer included in the click-through rate estimation model to obtain a sample image-text multi-modal vector; determine a sample click-through rate of the content sample based on the sample image-text multi-modal vector through an estimation layer included in the click-through rate estimation model; and adjust a parameter of the click-through rate estimation model and continue training based on a difference between the sample click-through rate and the training label, and stop training in a case that a training condition is satisfied.

In an embodiment, when the to-be-processed content is the video content, the description text is the text content included in the video content, and the image is the image extracted from the video content.

In an embodiment, the image is a key frame image extracted from the video content, the key frame image is obtained through an image extraction step, and the data obtaining module 1202 is further configured to: extract at least two video key frames from the video content; determine relevance between each of the at least two video key frames and the description text; and determine a key frame image in the at least two video key frames according to the relevance.

Figure 14:
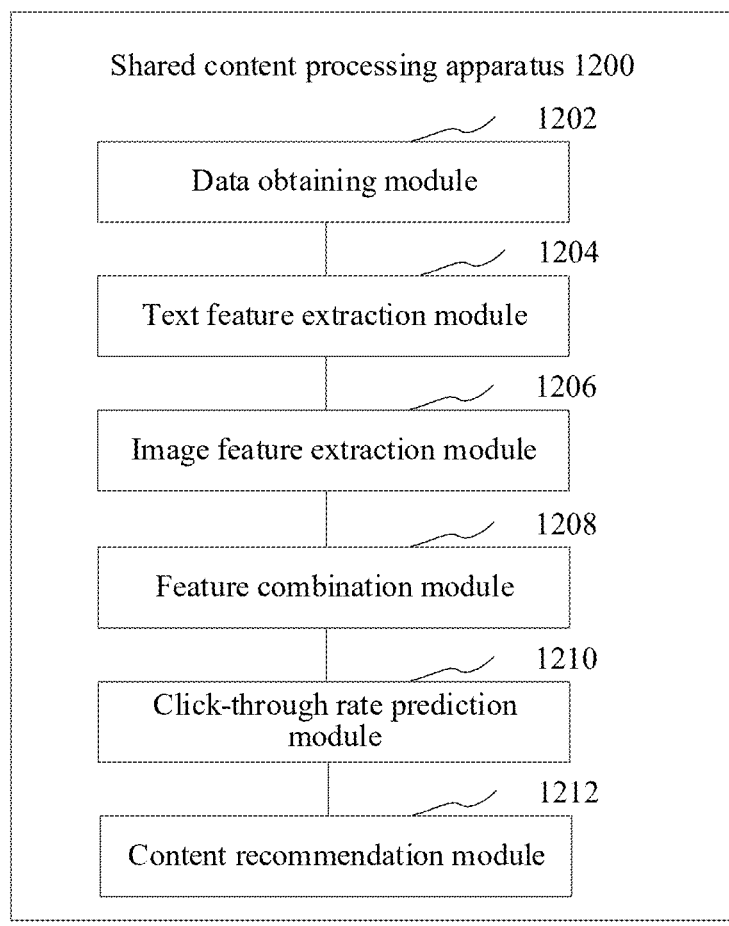
FIG. 14 is a structural block diagram of a content processing apparatus according to still another embodiment of this disclosure.

In an embodiment, the data obtaining module 1202 is further configured to obtain a search keyword; and determine to-be-processed content according to the search keyword. As shown in FIG. 14, the content processing apparatus further includes a content recommendation module 1212, configured to sort the to-be-processed content according to an estimated click-through rate after the click-through rate of the to-be-processed content is estimated; and recommend the to-be-processed content according to a sorting result.

In an embodiment, the content recommendation module 1212 is further configured to: obtain a history click-through rate of the to-be-processed content according to history impression information in a case that the to-be-processed content includes the history impression information; and sort the to-be-processed content according to the estimated click-through rate and the history click-through rate.

For specific definition of the content processing apparatus, refer to the definition of the foregoing content processing method. Details are not described herein again. Some or all of modules of the content processing apparatus may be implemented by software, hardware, and a combination thereof. The foregoing modules may be embedded in or independent of a processor of a computer device in the form of hardware, or stored in a memory of the computer device in the form of software, so that the processor may call and execute the operations corresponding to the foregoing modules.

In an embodiment, a computer device is provided. Specifically, the computer device may be the server 104 in FIG. 1, and an internal structure of the computer device may be shown in FIG. 15. The computer device includes a processor, a memory, and a network interface that are connected by using a system bus. The processor of the computer device is configured to provide computing and control capabilities. The memory of the computer device includes a nonvolatile storage medium and an internal memory. The nonvolatile storage medium stores an operating system, a computer program, and a database. The internal memory provides an environment for the execution of the operating system and the computer program in the nonvolatile storage medium. The database of the computer device is configured to store data such as shared content, a description text, and an image included in the shared content. The network interface of the computer device is configured to connect to and communicate with an external terminal by using a network according to the method. The computer program is executed by the processor to perform a content processing method.

Figure 15:
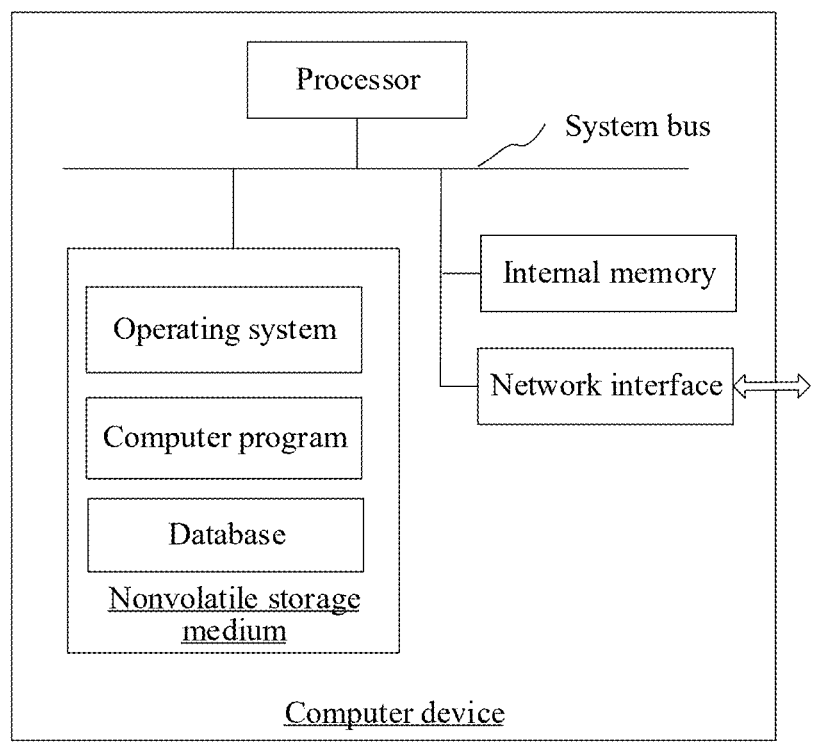
FIG. 15 is a diagram of an internal structure of a computer device according to an embodiment of this disclosure.

A person skilled in the art may understand that, the structure shown in FIG. 15 is only a block diagram of a part of a structure related to a solution of this disclosure and does not limit the computer device to which the solution of this disclosure is applied. Specifically, the computer device may include more or fewer components than those in the drawings, or include a combination of some components, or include different component layouts.

An embodiment further provides a computer device, including a memory and a processor, where the memory stores a computer program; and when executing the computer program, the processor performs the steps in the foregoing method embodiments.

An embodiment provides a computer-readable storage medium storing a computer program. The computer program, when executed by a processor, performs the steps of the foregoing method embodiments.

An embodiment provides a computer program product or computer-readable instructions. The computer program product or the computer-readable instructions includes computer-readable instructions, and the computer-readable instructions are stored in a computer-readable storage medium. A processor of a computer device reads the computer-readable instructions from the computer-readable storage medium, and executes the computer-readable instructions, so that the computer device performs the steps of the foregoing method embodiments.

A person of ordinary skill in the art may understand that all or some of the processes of the methods in the foregoing embodiments may be implemented by a computer program instructing relevant hardware. The computer program may be stored in a non-volatile computer-readable storage medium. When the computer program runs, the processes of the foregoing methods in the embodiments are performed. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this disclosure, which are described specifically and in detail, and therefore cannot be construed as a limitation to the patent scope of the present invention. A person of ordinary skill in the art may further make several variations and improvements without departing from the ideas of this disclosure, and such variations and improvements all fall within the protection scope of this disclosure. Therefore, the protection scope of this disclosure shall be subject to the protection scope of the appended claims.

What is claimed is:

1. A content processing method, executed by a computer device, the method comprising:
 obtaining a description text describing a totality of a to-be-processed content comprising a plurality of video frames;
 extracting an image from the to-be-processed content, wherein the image is a key image extracted among the plurality of video frames of the to-be-processed content, and wherein the extracting comprises:
  extracting at least two video key frames from the to-be-processed content;
  determining a relevance between each of the at least two video key frames and the description text, wherein the relevance is between a key action in a movement or a change of character or an object in the key image and the description text; and determining the key image in the at least two video key frames according to the relevance;

performing feature extraction on the description text based on text semantics to obtain a text eigenvector;

performing feature extraction on the image based on image semantics to obtain an image eigenvector;

combining the text eigenvector with the image eigenvector to obtain an image-text multi-modal vector; and generating an estimated click-through rate of the to-be-processed content according to the image-text multi-modal vector.

2. The method according to claim 1, wherein performing feature extraction on the description text based on text semantics comprises extracting the text eigenvector through a text semantics extraction network; and performing feature extraction on the image based on image semantics comprises extracting the image eigenvector through an image semantics extraction network.

3. The method according to claim 1, wherein performing feature extraction on the description text based on text semantics comprises:

extracting a text semantics feature from the description text through a text semantics extraction network; and encoding based on the text semantics feature to obtain the text eigenvector of a preset dimension.

4. The method according to claim 1, wherein performing feature extraction on the image based on image semantics comprises:

extracting an image semantics feature from the image through an image semantics extraction network; and encoding the image semantics feature to obtain the image eigenvector of a preset dimension.

5. The method according to claim 1, wherein:

combining the text eigenvector with the image eigenvector to obtain the image-text multi-modal vector comprises combining the text eigenvector with the image eigenvector through a feature connection layer to obtain the image-text multi-modal vector; and generating the estimated click-through rate of the to-be-processed content according to the image-text multi-modal vector comprises:

inputting the image-text multi-modal vector into an estimation layer of a click-through rate estimation model; and generating the estimated click-through rate of the to-be-processed content through the estimation layer according to the image-text multi-modal vector.

6. The method according to claim 1, wherein the processing method of the to-be-processed content is performed by a click-through rate estimation model and the method further comprises obtaining the click-through rate estimation model through training operations comprising:

obtaining a content sample and a training label of the content sample, wherein:

the content sample comprises a history content including description text of the history content and an image of the history content; and the training label comprises a history click-through rate of the history content; and training the click-through rate estimation model based on the content sample and the training label.

7. The method according to claim 6, wherein training the click-through rate estimation model based on the content sample and the training label comprises:

extracting a sample text eigenvector of the content sample through a pre-trained text semantics extraction network in the click-through rate estimation model;

extracting a sample image eigenvector of the content sample through a pre-trained image semantics extraction network comprised in the click-through rate estimation model;

combining the sample text eigenvector with the sample image eigenvector through a feature connection layer in the click-through rate estimation model to obtain a sample image-text multi-modal vector;

determining a sample click-through rate of the content sample based on the sample image-text multi-modal vector through an estimation layer in the click-through rate estimation model; and adjusting a parameter of the click-through rate estimation model and continuing training based on a difference between the sample click-through rate and the training label until a training termination condition is satisfied.

8. The method according to claim 1, wherein the method further comprises:

obtaining a search keyword;

determining the to-be-processed content according to the search keyword;

sorting the to-be-processed content according to after the estimated click-through rate of the to-be-processed content is generated; and recommending the to-be-processed content according to a sorting result.

9. The method according to claim 8, wherein sorting the to-be-processed content according to the estimated click-through rate comprises:

obtaining a history click-through rate of the to-be-processed content according to history impression information when the to-be-processed content comprises the history impression information; and sorting the to-be-processed content according to the estimated click-through rate and the history click-through rate.

10. A computer device, comprising a processor and a memory, the memory storing computer-readable instructions, the processor being configured to execute the computer-readable instructions to cause the computer device to:

obtain a description text describing a totality of a to-be-processed content comprising a plurality of video frames;

extract an image from the to-be-processed content, wherein the image is a key image extracted among the plurality of video frames of the to-be-processed content, and wherein the extracting comprises:

extracting at least two video key frames from the to-be-processed content;

determining a relevance between each of the at least two video key frames and the description text, wherein the relevance is between a key action in a movement or a change of character or an object in the key image and the description text; and determining the key image in the at least two video key frames according to the relevance;

perform feature extraction on the description text based on text semantics to obtain a text eigenvector;

perform feature extraction on the image based on image semantics to obtain an image eigenvector;

combine the text eigenvector with the image eigenvector to obtain an image-text multi-modal vector; and generate an estimated click-through rate of the to-be-processed content according to the image-text multi-modal vector.

11. The computer device of claim 10, the processor is further configured to execute the computer-readable instructions to cause the computer device to:
perform feature extraction on the description text based on text semantics by extracting the text eigenvector through a text semantics extraction network; and
perform feature extraction on the image based on image semantics by extracting the image eigenvector through an image semantics extraction network.

12. The computer device of claim 10, the processor is further configured to execute the computer-readable instructions to cause the computer device to perform feature extraction on the description text based on text semantics by:
extracting a text semantics feature from the description text through a text semantics extraction network; and
encoding based on the text semantics feature to obtain the text eigenvector of a preset dimension.

13. The computer device of claim 10, the processor is further configured to execute the computer-readable instructions to cause the computer device to perform feature extraction on the image based on image semantics by:
extracting an image semantics feature from the image through an image semantics extraction network; and
encoding the image semantics feature to obtain the image eigenvector of a preset dimension.

14. The computer device of claim 10, the processor is further configured to execute the computer-readable instructions to cause the computer device to combine the text eigenvector with the image eigenvector to obtain the image-text multi-modal vector by combining the text eigenvector with the image eigenvector through a feature connection layer to obtain the image-text multi-modal vector; and
the processor is further configured to execute the computer-readable instructions to cause the computer device to generate the estimated click-through rate of the to-be-processed content according to the image-text multi-modal vector by:
inputting the image-text multi-modal vector into an estimation layer of a click-through rate estimation model; and
generating the estimated click-through rate of the to-be-processed content through the estimation layer according to the image-text multi-modal vector.

15. The computer device of claim 10, the processor is configured to execute the computer-readable instructions to cause the computer device to:
obtain a search keyword;
determine the to-be-processed content according to the search keyword;
sort the to-be-processed content according to the estimated click-through rate of after the to-be-processed content is generated; and
recommend the to-be-processed content according to a sorting result.

16. A non-transitory computer-readable storage medium, storing computer-readable instructions, the computer-readable instructions being executed by one or more processors to cause a computer device to performed steps, comprising:
obtaining a description text describing a totality of a to-be-processed content comprising a plurality of video frames;
extracting an image from the to-be-processed content, wherein the image is a key image extracted among the plurality of video frames of the to-be-processed content, and wherein the extracting comprises:
extracting at least two video key frames from the to-be-processed content;
determining a relevance between each of the at least two video key frames and the description text, wherein the relevance is between a key action in a movement or a change of character or an object in the key image and the description text; and
determining the key image in the at least two video key frames according to the relevance;
performing feature extraction on the description text based on text semantics to obtain a text eigenvector;
performing feature extraction on the image based on image semantics to obtain an image eigenvector;
combining the text eigenvector with the image eigenvector to obtain an image-text multi-modal vector; and
generating an estimated click-through rate of the to-be-processed content according to the image-text multi-modal vector.

* * * * *